(12) United States Patent
Fieldman

(10) Patent No.: US 12,306,878 B1
(45) Date of Patent: May 20, 2025

(54) PHASED SCRIPT ANALYSIS FOR AN EXTENDED REALITY ENVIRONMENT

(71) Applicant: Curio XR (VR EDU), Gainesville, FL (US)

(72) Inventor: Ethan Fieldman, Gainesville, FL (US)

(73) Assignee: Curio XR (VR EDU), Gainesville, FL (US)

( * ) Notice: Subject to any disclaimer, the term of this patent is extended or adjusted under 35 U.S.C. 154(b) by 0 days.

(21) Appl. No.: 18/670,392

(22) Filed: May 21, 2024

Related U.S. Application Data

(63) Continuation-in-part of application No. 18/594,311, filed on Mar. 4, 2024.

(51) Int. Cl.
  *G06F 16/9038* (2019.01)
  *G06T 11/00* (2006.01)
  *G09B 7/02* (2006.01)

(52) U.S. Cl.
  CPC .......... *G06F 16/9038* (2019.01); *G06T 11/00* (2013.01); *G09B 7/02* (2013.01)

(58) Field of Classification Search
  CPC ........ G06F 16/9038; G06T 11/00; G09B 7/02
  See application file for complete search history.

(56) References Cited

U.S. PATENT DOCUMENTS

| | | |
|---|---|---|
| 11,531,448 B1 | 12/2022 | Fieldman |
| 11,756,272 B2 | 9/2023 | Brent et al. |
| 2016/0026242 A1 | 1/2016 | Burns et al. |
| 2019/0199658 A1* | 6/2019 | Kim ................... G06F 16/90332 |
| 2020/0098140 A1 | 3/2020 | Jagnow et al. |
| 2020/0356592 A1 | 11/2020 | Yada et al. |
| 2021/0272553 A1 | 9/2021 | Jose et al. |
| 2022/0027425 A1* | 1/2022 | Saksonov ............. G06F 16/951 |
| 2022/0207066 A1* | 6/2022 | Gangwar ............ G06F 16/3335 |
| 2022/0309096 A1* | 9/2022 | Patil ...................... G06F 16/685 |
| 2023/0290338 A1* | 9/2023 | Robert Jose ...... G06F 16/90332 |
| 2024/0104864 A1 | 3/2024 | Mulliken et al. |
| 2024/0289686 A1* | 8/2024 | Desgarennes .......... G06N 3/006 |
| 2024/0330589 A1* | 10/2024 | Kotaru .................. G06F 40/205 |

* cited by examiner

*Primary Examiner* — Eddy Saint-Vil
(74) *Attorney, Agent, or Firm* — FINNEGAN, HENDERSON, FARABOW, GARRETT & DUNNER L.L.P.

(57) ABSTRACT

Disclosed herein are methods, systems, and computer-readable media for causing a machine learning model to generate improved answer data based on an extended reality environment. In an embodiment, a method may include receiving the query, identifying at least one extended reality component associated with the extended reality environment as relating to the query, the at least one extended reality component comprising at least one of an object, a recording, or transcript information, and generating a prompt based on the query and the at least one extended reality component. The method may further include transmitting the prompt to a machine learning model, in response to the transmitted prompt, receiving answer data from the machine learning model, and based on the received answer data, generating content in the extended reality environment.

21 Claims, 9 Drawing Sheets

PHASED SCRIPT ANALYSIS FOR AN EXTENDED REALITY ENVIRONMENT

CROSS-REFERENCE TO RELATED APPLICATIONS

This application is a continuation-in-part of U.S. patent application Ser. No. 18/594,311, filed Mar. 4, 2024, currently pending. The disclosure of the above-referenced application is expressly incorporated herein by reference in its entirety.

FIELD OF DISCLOSURE

The disclosed embodiments generally relate to systems, devices, methods, and computer-readable media for causing a machine learning model to generate improved answer data based on an extended reality environment.

SUMMARY

Machine learning models may be capable of receiving an input and generating an output. For example, a machine learning model may receive a question as an input and generate an answer to the question as an output. In some instances, machine learning models may be used in educational settings to answer questions input by students related to a lecture or an assignment. In other instances, machine learning models may be used in professional and recreational settings, to answer questions input by users.

Extended reality environments may provide realistic and immersive settings for sharing information. The improved processor speeds, data storage, and data transfer of extended reality devices, such as extended reality headsets, smart glasses, and other wearable extended reality devices, may allow for hands-on collaboration and presentation of information, such as virtual information, among many users and in ways not possible in a purely physical environment. For example, extended reality environments may enhance student learning by allowing for interactive education. In other examples, extended reality environments may allow people to share and explain concepts in a more immersive way than in a physical setting alone.

As the use of extended reality environments in educational and professional settings becomes more prevalent, a challenge exists in incorporating the use of machine learning models to effectively answer user questions related to elements in the extended reality environment. Conventional systems do not provide proper context and background information from the extended reality environment for the machine learning model to provide a useful answer to the user. For example, an extended reality environment may extend infinitely around a user and may contain a variety of virtual reality components. Therefore, to provide relevant answer data in response to a user question related to the extended reality environment, the machine learning model should have context regarding where the user is located in the extended reality environment, what the user has most recently interacted with in the extended reality environment, what the user is looking at in the extended reality environment, and any other contextual information that may be relevant to the user question. Without proper context and background information, a machine learning model may generate an answer to a question that includes irrelevant information or information that is too simple or too complex for the user. Further, conventional systems may generate fake information (hallucinations) in response to a question, which may result in a user learning false information.

Therefore, to address these technical deficiencies in combining extended reality environments and machine learning models, solutions should be provided to cause a machine learning model to generate improved answer data based on an extended reality environment. For example, and as discussed further herein, disclosed embodiments involve identifying components in the extended reality environment of the user to generate a prompt for a machine learning model based on the user question and the identified components in the extended reality environment. As another example, and as discussed further herein, disclosed embodiments involve generating more detailed and targeted prompts for a machine learning model by providing context and background information gathered from the extended reality environment in the prompt to the machine learning model. These solutions may allow a machine learning model to generate answer data that is more relevant to the question posed by the user because the prompt may provide contextual information about the user question. Such solutions may also involve presenting the answer data generated by the machine learning model in the extended reality environment in a way that is accessible and useful to the user.

SUMMARY

The disclosed embodiments describe a method for causing a machine learning model to generate improved answer data based on an extended reality environment. For example, the method may comprise preprocessing a query associated with the extended reality environment from a user by: receiving the query, identifying at least one extended reality component associated with the extended reality environment as relating to the query, the at least one extended reality component comprising at least one of an object, a recording, or transcript information, and generating a prompt based on the query and the at least one extended reality component. The method may further comprise transmitting the prompt to a machine learning model, in response to the transmitted prompt, receiving answer data from the machine learning model, and based on the received answer data, generating content in the extended reality environment.

According to a disclosed embodiment, identifying the at least one extended reality component may comprise determining that the extended reality component is rendered in closest proximity to the user in the extended reality environment relative to at least one other extended reality component.

According to a disclosed embodiment, identifying the at least one object may comprise identifying an object in the extended reality environment that the user interacted with prior to receiving the query.

According to a disclosed embodiment, identifying the at least one object may comprise identifying an object that the user is viewing or virtually holding.

According to a disclosed embodiment, identifying the at least one extended reality component may comprise identifying a most recent timestamp corresponding to a point at which the user paused the recording.

According to a disclosed embodiment, identifying the at least one extended reality component may comprise identifying a most recent recording of an interaction with a second user in the extended reality environment.

According to a disclosed embodiment, the operations may further comprise identifying at least one of a title of a course, a course code, or an institution name associated with a system rendering the extended reality environment.

According to a disclosed embodiment, the operations may further comprise identifying a prior query from the user.

According to a disclosed embodiment, generating the prompt may comprise converting the query and the at least one extended reality component into a text representation.

According to a disclosed embodiment, the prompt may be based on the query and at least two extended reality components associated with a same extended reality session.

The disclosed embodiments may also describe a system for generating prompts for causing a machine learning model to generate improved answer data based on an extended reality environment. For example, in an embodiment, the system may comprise at least one memory storing instructions and at least one processor configured to execute the instructions to perform operations for generating prompts for causing a machine learning model to generate improved answer data based on an extended reality environment. In an embodiment, the operations may comprise preprocessing a query associated with the extended reality environment from a user, by: receiving the query, identifying at least one extended reality component associated with the extended reality environment as relating to the query, the at least one extended reality component comprising at least one of an object, a recording, or transcript information, and generating a prompt based on the query and the at least one extended reality component. The operations may further comprise transmitting the prompt to a machine learning model, in response to the transmitted prompt, receiving answer data from the machine learning model, and based on the received answer data, generating content in the extended reality environment.

According to a disclosed embodiment, generating content in the extended reality environment may comprise rendering a text display, based on the answer data, in the extended reality environment.

According to a disclosed embodiment, generating content in the extended reality environment may comprise playing an audio recording based on the answer data.

According to a disclosed embodiment, generating content in the extended reality environment may comprise rendering a virtual reality object, based on the answer data, in the extended reality environment.

According to a disclosed embodiment, generating the prompt may further comprise generating the prompt based on an identified age or grade level of the user.

According to a disclosed embodiment, the identified age or grade level of the user may be determined based on at least one of: prior interactions of the user with the extended reality environment, the query, a level of vocabulary of the user, or a name of the course, a course code, or an institution name associated with a system rendering the extended reality environment.

According to a disclosed embodiment, generating the prompt may further comprise generating the prompt based on a query previously received from the user.

The disclosed embodiments may also describe a non-transitory computer readable medium including instructions that may be executable by one or more processors to perform operations that may comprise preprocessing a query associated with the extended reality environment from a user by: receiving the query, identifying at least one extended reality component associated with the extended reality environment as relating to the query, the at least one extended reality component comprising at least one of an object, a recording, or transcript information, and generating a prompt based on the query and the at least one extended reality component. The operations may further comprise transmitting the prompt to a machine learning model, in response to the transmitted prompt, receiving answer data from the machine learning model, and based on the received answer data, generating content in the extended reality environment.

According to a disclosed embodiment, the extended reality environment may comprise a view of a physical environment of the user and at least one virtual reality object.

According to a disclosed embodiment, the operations may further comprise generating the prompt based on the query and at least one object in the physical environment of the user.

The disclosed embodiments may also describe a method for generating prompts based on a phased script in an extended reality environment. The method may comprise: receiving a query from a user associated with a topic in the phased script, identifying at least one extended reality component associated with the extended reality environment as relating to the query, the at least one extended reality component comprising at least one of an object or a recording, identifying a section of the phased script associated with the topic, generating a prompt based on the query, the at least one extended reality component, and the section of the phased script, transmitting the prompt to an artificial intelligence model, in response to the transmitted prompt, receiving answer data from the artificial intelligence model, and based on the received answer data, generating content in the extended reality environment.

According to a disclosed embodiment, identifying the section of the phased script may comprise matching the at least one extended reality component from the extended reality environment with the section of the phased script.

According to a disclosed embodiment, the prompt may comprise instructions to generate answer data related to the section of the phased script.

According to a disclosed embodiment, the answer data may be limited by the section of the phased script.

According to a disclosed embodiment, the prompt may further include the phased script and an identification of the section of the phased script associated with the topic.

According to a disclosed embodiment, the phased script may comprise a plurality of sections, wherein each of the plurality of sections are associated with a respective topic.

According to a disclosed embodiment, identifying the section of the phased script may comprise identifying at least one of a name or a number of the section.

According to a disclosed embodiment, generating the prompt may comprise converting the query and the at least one extended reality component into a text representation.

According to a disclosed embodiment, the prompt may further comprise a prior query from the user.

The disclosed embodiments may also describe a system for generating prompts based on a phased script in an extended reality environment. For example, in some embodiments, the system may comprise at least one memory storing instructions and at least one processor configured to execute the instructions to perform operations for generating prompts based on a phased script in an extended reality environment. In some embodiments, the operations may comprise: receiving a query from a user associated with a topic in the phased script, identifying at least one extended reality component associated with the extended reality environment as relating to the query, the at least one extended reality component comprising at least one of an object or a recording, identifying a section of the phased script associated with the topic, generating a prompt based on the query, the at least one extended reality component, and the section of the phased script, transmitting the prompt to an artificial intelligence model, in response to the transmitted prompt, receiving answer data from the artificial intelligence model, and based on the received answer data, generating content in the extended reality environment.

According to a disclosed embodiment, the operations may further comprise identifying at least one recorded session associated with the phased script, and identifying a plurality of questions and answers from the recorded session associated with the section of the phased script, wherein the prompt may further include the plurality of questions and answers from the recorded session associated with the section of the phased script.

According to a disclosed embodiment, the at least one recorded session may comprise a recorded representation of a live session with a human speaker conducted in an extended reality environment.

According to a disclosed embodiment, the operations may further comprise converting the at least one recorded session into at least one text representation.

According to a disclosed embodiment, the prompt may further comprise instructions to provide answer data within a similarity threshold of the answers from the at least one recorded session.

According to a disclosed embodiment, the at least one recorded session may comprise a recorded representation of a live session with a large language model virtual speaker conducted in an extended reality environment.

The disclosed embodiments may also describer a non-transitory computer readable medium that may include instructions that may be executable by one or more processors to perform operations that may comprise: receiving a query from a user associated with a topic in the phased script, identifying at least one extended reality component associated with the extended reality environment as relating to the query, the at least one extended reality component comprising at least one of an object or a recording, identifying a section of the phased script associated with the topic, generating a prompt based on the query, the at least one extended reality component, and the section of the phased script, transmitting the prompt to an artificial intelligence model, in response to the transmitted prompt, receiving answer data from the artificial intelligence model, and based on the received answer data, generating content in the extended reality environment.

According to a disclosed embodiment, generating content in the extended reality environment may comprise rendering a text display, based on the answer data, in the extended reality environment.

According to a disclosed embodiment, generating content in the extended reality environment may comprise playing an audio output based on the answer data.

According to a disclosed embodiment, generating content in the extended reality environment may comprise rendering a virtual reality object, based on the answer data, in the extended reality environment.

According to a disclosed embodiment, identifying the at least one extended reality component may comprise determining that the extended reality component is rendered in closest proximity to the user in the extended reality environment relative to at least one other extended reality component.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
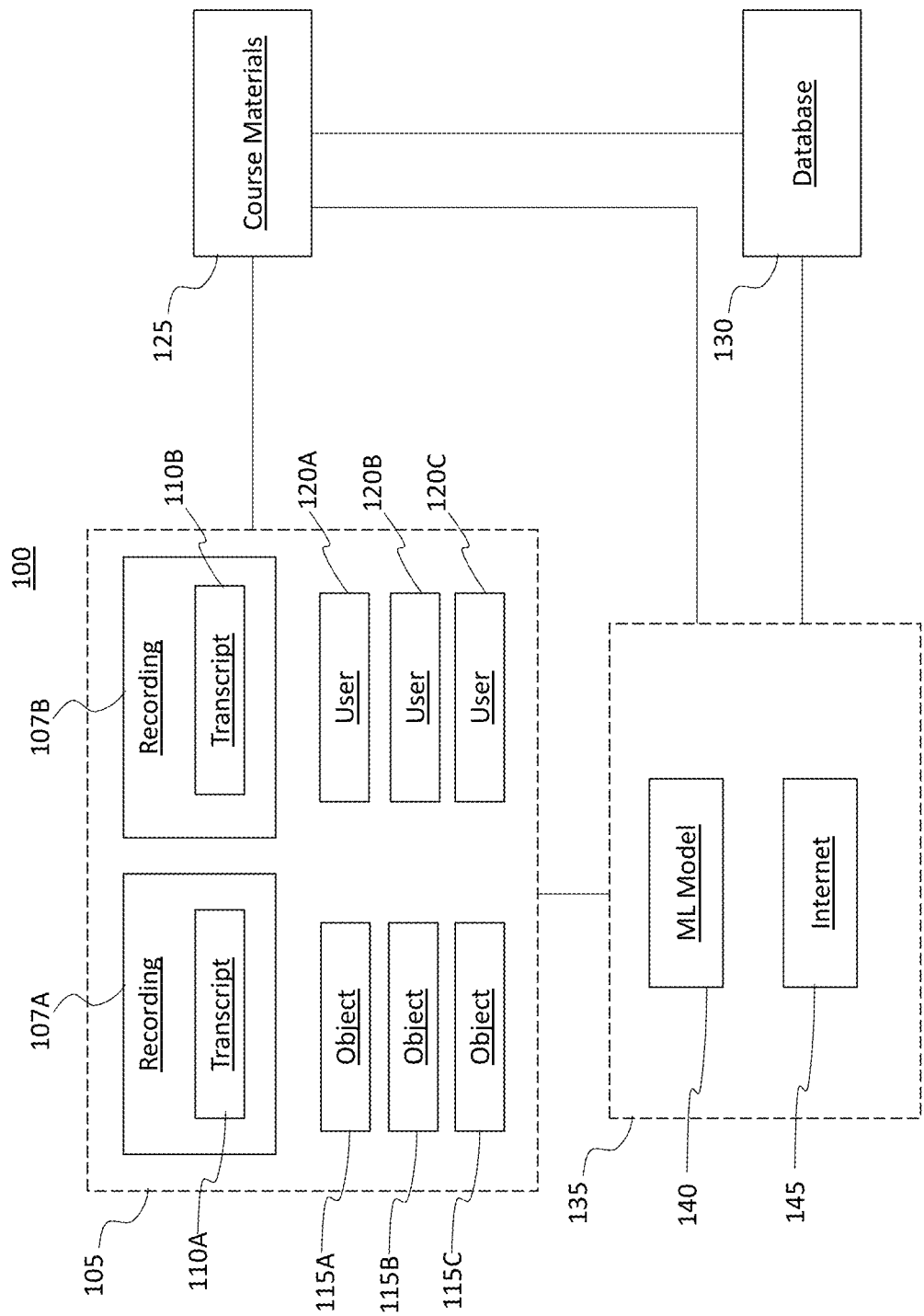
FIG. 1 is a block diagram of a machine learning model in combination with an extended reality environment, consistent with embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The techniques for causing a machine learning model to generate improved answer data based on an extended reality environment described herein overcome technological problems relating to providing relevant, useful, and targeted answer data to a user query relating to an extended reality environment. In particular, the disclosed embodiments provide techniques for identifying at least one extended reality component associated with the extended reality environment as relating to a user query and generating a prompt based on the query and the at least one extended reality component. As discussed above, a user in an extended reality environment may have a question related to an extended reality component and may want to receive an answer to the question from a machine learning model. Existing techniques for generating prompts for a machine learning model, however, fail to provide sufficient context and background information from the extended reality environment for the machine learning model to be able to provide targeted and specific answer data in response to the user question. For example, existing techniques may fail to identify relevant components in the extended reality environment that the user is looking at, has recently interacted with, or is close to in the extended reality environment. Without such contextual information about the interactions of the user with the extended reality environment, a machine learning model may not be able to provide relevant answer data to a user query.

The disclosed embodiments provide technical solutions to these and other problems arising from current techniques. For example, various disclosed embodiments provide a method for causing a machine learning model to generate improved answer data based on an extended reality environment by receiving a user query, identifying at least one extended reality component associated with the extended reality environment as relating to the query, and generating a prompt based on the query and the at least one extended reality component. The disclosed embodiments provide a method that allows a user of an extended reality environment to ask questions related to specific components within the extended reality environment and to receive answer data related to the question in the context of the specific component of the extended reality environment and other relevant background information about the user.

Reference will now be made in detail to the disclosed embodiments, examples of which are illustrated in the accompanying drawings. It should be noted that while some embodiments may refer to students or teachers, all of the disclosed embodiments may be used in other contexts as well, such as with any presenter and any audience or with a single user alone.

FIG. 1 is a block diagram of a system 100 for prompting a machine learning model to generate answer data, consistent with embodiments of the present disclosure. System 100 may include an extended reality environment 105. The term "extended reality environment," which may also be referred to as "extended reality," "extended reality space," or "extended environment," refers to all types of real-and-virtual combined environments and human-machine interactions at least partially generated by computer technology. The extended reality environment 105 may be a completely simulated virtual environment or a combined real-and-virtual environment that a user may perceive from different perspectives. In some examples, a user may interact with elements of the extended reality environment 105. One non-limiting example of an extended reality environment 105 may be a virtual reality environment, also known as "virtual reality" or a "virtual environment." An immersive virtual reality environment may be a simulated nonphysical environment which provides to the user the perception of being present in the virtual environment. Another non-limiting example of an extended reality environment 105 may involve a live direct or indirect view of a physical real-world environment that is enhanced with virtual computer-generated perceptual information, such as virtual objects that the user may interact with. Another non-limiting example of an extended reality environment 105 is a mixed reality environment, also known as "mixed reality" or a "mixed environment." A mixed reality environment may be a hybrid of physical real-world and virtual environments, in which physical and virtual objects may coexist and interact in real time. In some examples, both extended reality environments and mixed reality environments may include a combination of real and virtual worlds, real-time interactions, and accurate 3D registration of virtual and real objects. In some examples, both extended reality environments and mixed reality environments may include constructive overlaid sensory information that may be added to the physical environment. In other examples, both extended reality environment and mixed reality environments may include destructive virtual content that may mask at least part of the physical environment.

The extended reality environment 105 may comprise a plurality of recordings, such as recordings 107A and 107B. Recordings 107A and 107B may include audio and/or video media, such as voice recordings, video streams, or presentations. In some embodiments, recordings 107A and 107B may correspond to a prerecorded media, such as a video lecture. Prerecorded media may refer to any media which have been filmed or recorded prior to upload or presentation, such as a recording which has been recorded in advance of being displayed on a media viewing platform. Prerecorded video lectures may include any prerecorded video for educational or informational purposes. In some examples, video lectures may include information corresponding to formal education, such as education taught in schools or colleges.

Recording 107A may include a corresponding text transcript 110A and recording 107B may include a corresponding text transcript 110B. Text transcripts 110A and 110B may comprise a text-based copy of natural language, such as a written, typed, or printed version of language in recordings 107A and 107B. In some embodiments, text transcripts 110A and 110B may be acquired based on recordings 107A and 107B. Text transcripts, such as text transcripts 110A and 110B, may refer to a transcription of an audio recording and/or a video recording, such as a reproduction of words spoken in a video (e.g., recordings 107A and 107B). A text transcript may be acquired by generating, transmitting, obtaining, and/or receiving a transcription. For example, system 100 may receive a text transcript 110A and 110B of recordings 107A and 107B. In an example, the transcript may be already generated, such as a text transcript 110A or 110B of recording 107A or 107B stored in a database which may be accessible to system 100. Although FIG. 1 depicts two recordings 107A and 107B with corresponding text transcripts 110A and 110B, there may be any number of recordings with or without corresponding text transcripts in extended reality environment 105.

The extended reality environment 105 may also comprise a plurality of objects 115A, 115B, and 115C (115A-115C). In some embodiments, objects 115A-115C may comprise at least one of a three-dimensional object, a recording, a white board, or a text display. Additionally or alternatively, objects 115A-115C may comprise at least one of inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual representation of a physical object, a virtual representation of a physical environment, a virtual document, a virtual character or persona, a virtual computer screen, a virtual widget, or any other format for displaying information virtually. Although FIG. 1 depicts three objects 115A-115C, there may be any number of objects in extended reality environment 105. In some embodiments, such as augmented reality environments, an object may be a physical real-world object, which may be viewed through a video feed to extended reality device 210.

Extended reality environment 105 may also comprise user 120A, 120B, and 120C (120A-120C). In some embodiments, user 120A-120C may comprise a live person interacting with extended reality environment 105. In other embodiments, user 120A-120C may include a virtual character. A virtual character may be a simulated representation of a machine learning model and may be configured as a non-player character (e.g., avatar) or an interface for simulating human interaction, such as a chatbot. Users 120A-120C may be any combination of live human users and virtual characters or chatbots. Users 120A-120C may interact with each other, with objects 115A-115C, with recordings 107A and 107B, or with any other components of extended reality environment 105, as disclosed herein. Although FIG. 1 depicts three users 120A-120C, there may be any number of users in extended reality environment 105.

System 100 may further include a machine learning model 140 that may generate answer data, as described herein. Machine learning model 140 may comprise any machine learning model, including one or more of classifiers, neural networks, regression models, clustering models, a transformer model, encoder-decoder models, or the like, as non-limiting examples. Machine learning model 140 may comprise a model configured for generative artificial intelligence, including generative models such as transformers, generative adversarial networks, autoregressive models, diffusion models, and/or autoencoders. In some embodiments, machine learning model 140 may comprise a large language model trained with an internet dataset, such as a dataset stored on internet 150. A large language model may refer to a deep learning model capable of understanding and generating text, such as models which can generate a prediction of the next word in a phrase or sentence. Large language models may include one or more transformer models (or one or more encoders and/or decoders) and can be trained on large datasets and may therefore include a large number of parameters (e.g., millions, billions, or more parameters). A large language model (LLM) may be trained on one or more internet datasets, which may be datasets stored on the internet. For example, LLMs may be trained on private or publicly accessible datasets including information from books, articles, programming code, websites, or other text sources. It will be appreciated that transmitting and synthesizing data between disparate systems, which implement a solution rooted in computer technology rather than simply following rules, contributes to solving the complex problem of providing data to machine learning models. For example, transmitting queries to a machine learning model, as described herein, may enable faster, more efficient generation of answer data.

Machine learning model 140 may be improved by training. In some examples, machine learning model 140 may be trained with recordings 107A and 107B. For example, text transcripts 110A and 110B of recordings 107A and 107B may be provided to machine learning model 140 for training. In an example where recordings 107A and 107B correspond to a lecture for a course or class, machine learning model 140 may be trained with data from other materials for the course or class. For example, machine learning model 120 may be trained with course materials 125, which can include other lectures, assignments, or textbooks for the course. Machine learning model 140 may also be trained with data from database 130.

Figure 2:
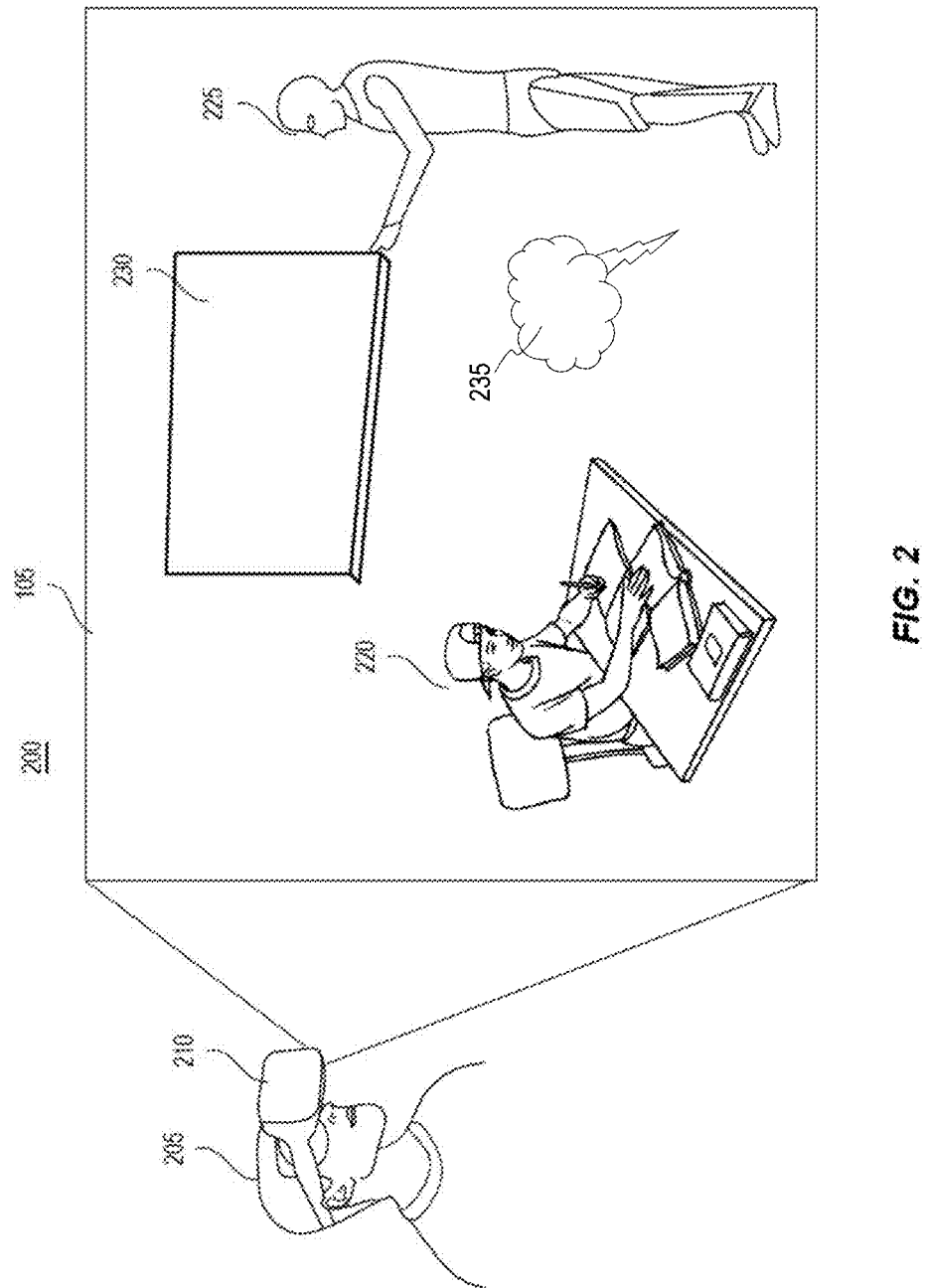
FIG. 2 is an illustration of a virtual reality implementation, consistent with embodiments of the present disclosure.

FIG. 2 illustrates an extended reality implementation, consistent with embodiments of the present disclosure. Extended reality system 200 may include extended reality environment 105, as disclosed herein with respect to FIG. 1. User 205 may interact with extended reality environment 105 by operating an extended reality device, such as extended reality device 210. In some embodiments, user 205 may correspond to at least one of user 120A-120C, as disclosed herein with respect to FIG. 1. Extended reality device 210 may include any type of device or system that enables user 205 to perceive and/or interact with extended reality environment 105. An extended reality device 210 may enable a user to perceive and/or interact with extended reality environment 105 through one or more sensory modalities. Some non-limiting examples of such sensory modalities may include visual, auditory, haptic, somatosensory, and olfactory. Consistent with one aspect of the disclosure, the extended reality device 210 may be a wearable device, such as a head-mounted device, for example, smart glasses, smart contact lens, extended reality devices (e.g., the Meta Quest Pro, Apple Vision Pro, HTC VIVE, Oculus, Valve Index) or any other device worn by a user for purposes of presenting an extended reality environment 105 to the user 205. Other extended reality devices may include a holographic projector or any other device or system capable of providing an extended reality, virtual reality, mixed reality, or any immersive experience. Typical components of wearable extended reality devices may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality device 210 may be a non-wearable extended reality device which may include multi-projected environment devices. In some embodiments, an extended reality device 210 may be configured to change the viewing perspective of the extended reality environment 105 in response to movements of the user 205 and in response to head movements of the user 205 in particular. In one example, a wearable extended reality device 210 may change the field-of-view of the extended reality environment 105 in response to a change of the head pose of the user 205, such as by changing the spatial orientation without changing the spatial position of the user 205 in the extended reality environment 105.

Extended reality environment 105 may include a virtual user rendering 220 of user 205 and a virtual character 225. Virtual user rendering 220 may include a visual representation of user 205 within extended reality environment 105. Virtual user rendering 220 may allow for and/or visualize (e.g., animate within extended reality environment 105) virtual interactions of user 205 with components in extended reality environment 105. Virtual character 225 may be a simulated representation of a machine learning model and may be configured as a non-player character (e.g., avatar) or an interface for simulating human interaction, such as a chatbot. For example, virtual character 225 may receive prompts such as a question from user 205 through user rendering 220, and virtual character 225 may generate answer data using machine learning models, as described herein. Virtual character 225 may be configured to interact with user rendering 220 through audio (e.g., conversing via speech and hearing), or through the display (e.g., answer data may be presented on virtual display 230). In some examples, extended reality system 100 may be configured for interactions between user rendering 220 and virtual character 225, including interactions where virtual character 225 receives a prompt from user rendering 220, such that extended reality system 105 may select a data domain from the extended reality system 100 to generate answer data corresponding to the prompt. In some embodiments, extended reality system 100 may be configured to cause user rendering 220 to animate based on interactions (e.g., movements, gestures, button presses) from user 205. While certain aspects discussed herein may be described with respect to only user 205, it is appreciated that such aspects may cause corresponding actions by user rendering 220 (e.g., cause user rendering 220 to copy, mimic, or indicate an action by user 205). Similarly, while certain aspects discussed herein may be described with respect to only user rendering 220, it is appreciated that such aspects may correspond to an initial action (e.g., a similar action, a same action, an action mimicked by user rendering 220) by user 205.

Figure 5:
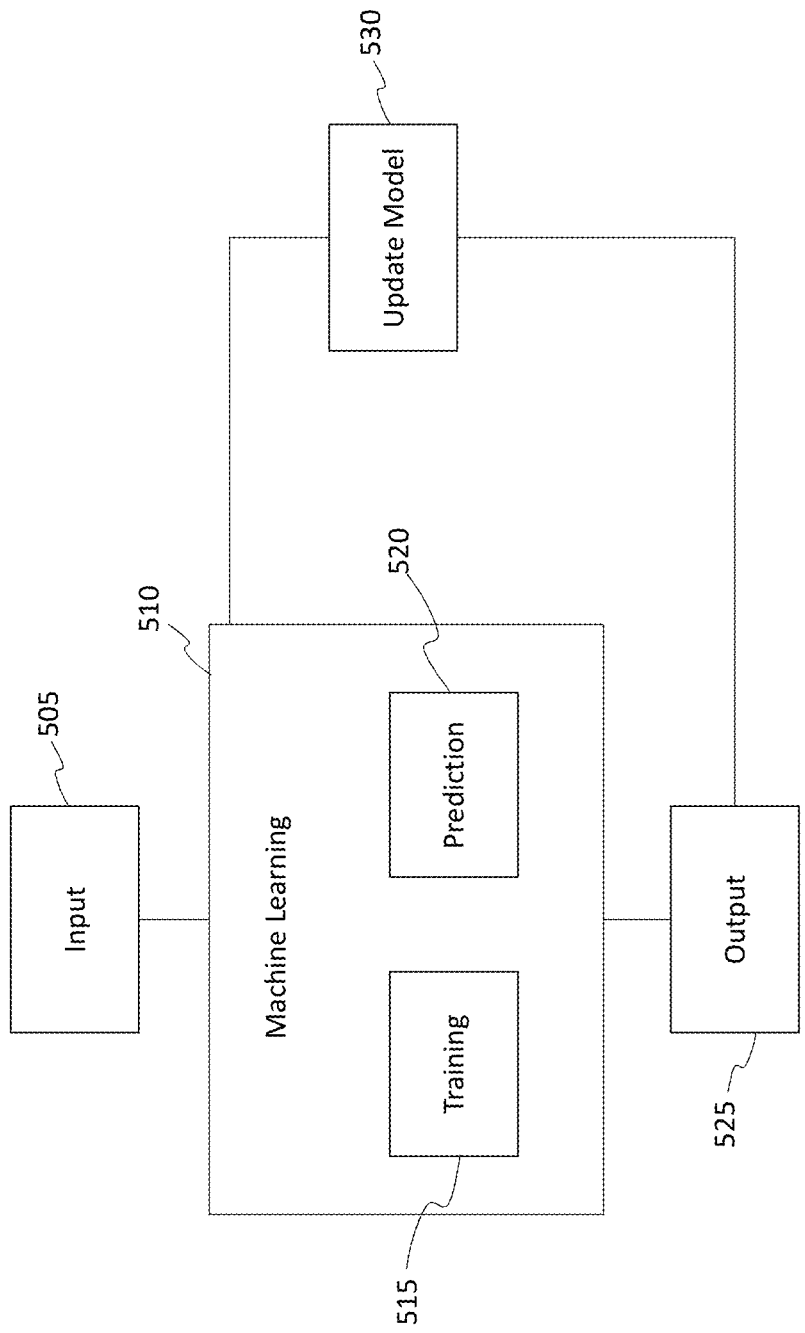
FIG. 5 is a block diagram of training a machine learning model, consistent with embodiments of the present disclosure.

Extended reality environment 105 may also include a virtual reality object 235. In some embodiments, virtual reality object 235 may correspond to at least one of objects 115A-115C, as disclosed herein with respect to FIG. 1. For example, virtual reality object 235 may comprise at least one of inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual representation of a physical object, a virtual representation of a physical environment, a virtual document, a virtual character or persona, a virtual computer screen, a virtual widget, or any other format for displaying information virtually. Although FIG. 5 depicts one virtual reality object 235, there may be any number of virtual reality objects 235 in extended reality environment 105. In some embodiments, user 205 may interact with virtual reality objects 235 by viewing, virtually holding, moving, creating, modifying, deleting, or otherwise interacting with virtual reality objects 235. In other embodiments, user 205 through user rendering 220 may interact with virtual character 225 by asking questions about the virtual reality object 235. A prompt may be generated based on the question asked by user 205, the virtual reality object 235, and a data domain from the extended reality environment 105 which may allow virtual character 225 to generate and provide answer data to the question.

It will be appreciated that extended reality system 100 may enable improved learning for user 205, as the system 200 may emulate a formal education experience based in reality, such as one conducted in a classroom, when such reality-based experience may not exist, such as when a student may be learning from a prerecorded video lecture. In an example, virtual character 225 may represent an educator such as a teacher or a tutor and may include a simulated voice of an educator. Thus, extended reality environment 105 may increase the engagement and/or participation of user 205 by emulating a live classroom experience. It will be appreciated that combining an extended reality environment with a machine learning model (e.g., an LLM), for generating predictive output, forms a non-conventional and non-generic arrangement, which contributes to generating real time output for prompt inquires in an engaging manner.

Figure 3:
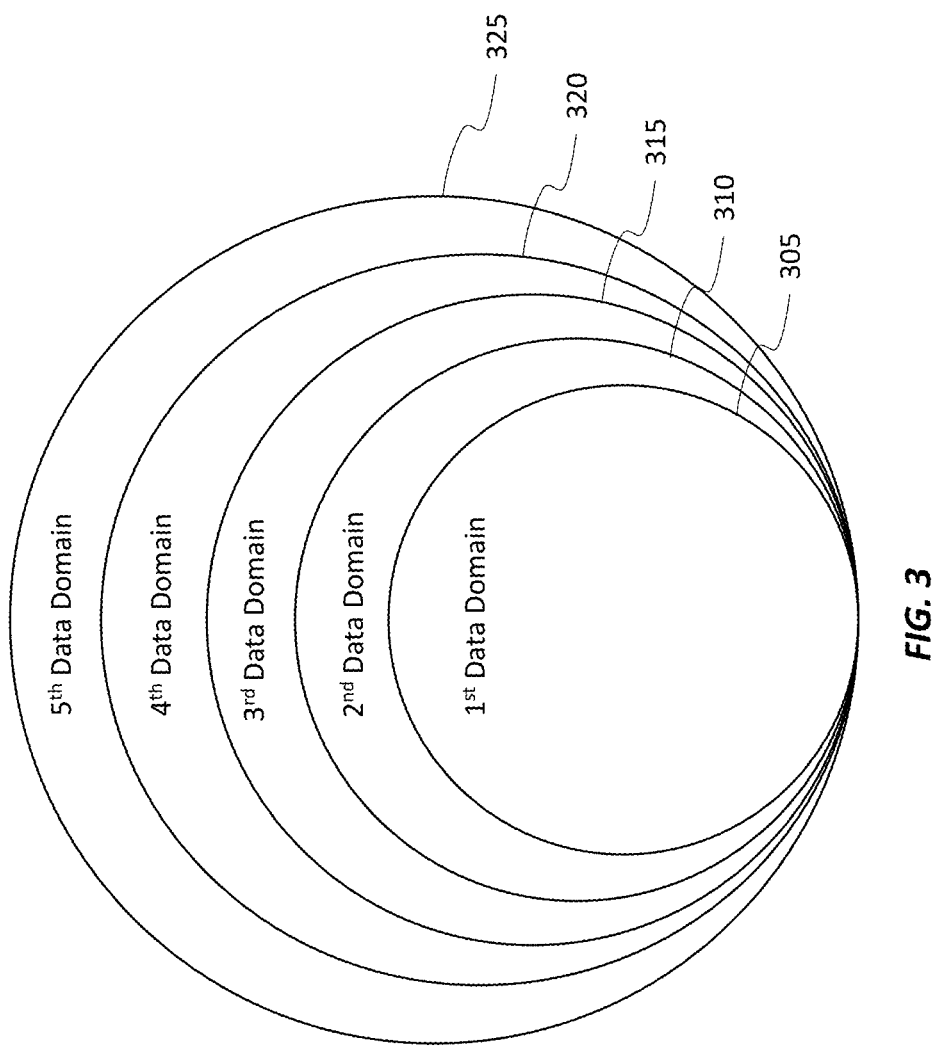
FIG. 3 is an illustration of data domains, consistent with embodiments of the present disclosure.

FIG. 3 depicts a plurality of data domains 305, 310, 315, 320, and 325 (data domains 305-325). A data domain, such as data domains 305-325, may refer to a specific sphere of data, such a specific realm, scope, or region of data. A data domain may include a grouping or categorization of data. For example, a data domain may be a portion of data from a data source. In some examples, a data domain may include one or more other data domains, such as where broader data domains capture or encompass narrower data domains and include the information corresponding to narrower data domains. For example, fifth data domain 325 may include fourth data domain 320, which may include third data domain 315, which may include second data domain 310, which may include first data domain 305, where first data domain 305 may have the smallest scope of data. Data domains may refer to knowledge domains, including a realm of knowledge available or accessible (e.g., to a system or a machine learning model).

Figure 4:
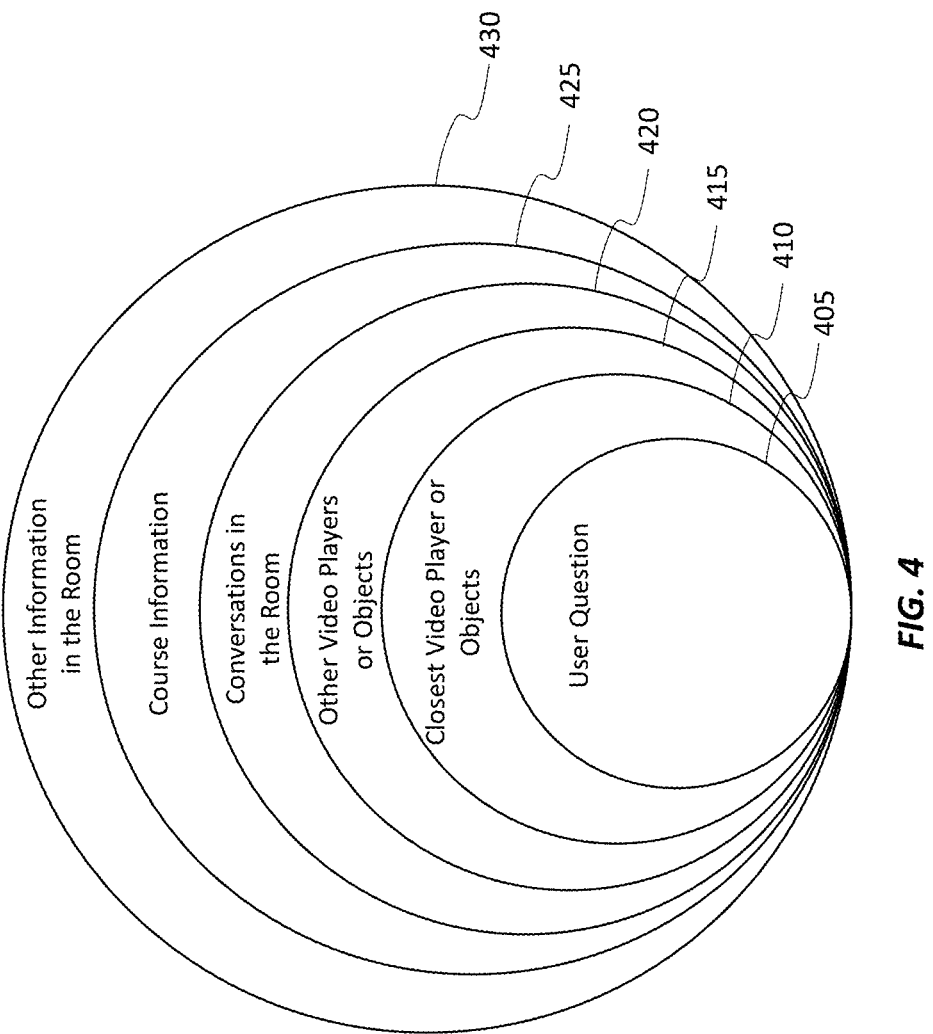
FIG. 4 is an illustration of data domains, consistent with embodiments of the present disclosure.

Data domains may refer to different levels, types, or amounts of data captured from an extended reality environment. For example, as depicted in FIG. 4, the first data domain 405 may comprise a user question. A user may be interacting with the extended reality environment and ask a question verbally or in writing about content in the extended reality environment. The second data domain 410 may comprise information obtained from the closest video player or object in the extended reality environment. For example, it may be determined that user is located in the extended reality environment near a particular video player or object. The content of the video player or the object may be included in the second data domain 410 to provide additional context to the student question of data domain 405. Data domain 415 may include other video players or objects. For example, the user may be located in the extended reality environment near additional video players or objects that may be related to the closest video player or object of data domain 410. Information from the other nearby video players or objects of the third data domain 415 may provide additional context to the student question and the information in the closest video player or object of the first data domain 405 and the second data domain 410. The fourth data domain 420 may include conversation in the extended reality environment. For example, the extended reality environment that the user is located in may be populated by other users, which may be live humans or virtual chatbots or characters. The user may interact with the other users in the extended reality environment by asking questions or discussing content of the extended reality environment with the other users. The information contained in the conversations with the other users may be used to provide additional context to the information provided in first, second, and third data domains 405, 410, and 415. The fifth data domain 425 may include course information. Course information may include lectures, assignments, or textbooks related to a course that the user is participating in. Course information may provide a broad amount of data relating to any topic in the course that the student is participating in and may provide additional context to the first, second, third, and fourth data domains 405, 410, 415, and 420, respectively. The sixth data domain 440 may include any other information that is located in the extended reality environment. This information may include any other extended reality objects, users, conversations, or other content in the extended reality environment of the user.

In some embodiments, a specific data domain 405-440 may be selected. Selecting a data domain may include identifying or determining a data domain, such as choosing a data domain from among a plurality of data domains. By accurately and intelligently selecting a data domain, system 100 may maximize relevant information that may be provided to a machine learning model and minimize irrelevant information for analysis. This may reduce strain on processing resources and bandwidth. For example, by selecting a data domain, system 100 can provide helpful context and/or background information to a machine learning model, while reducing strains on storage and/or memory by not providing information that may not be relevant to a given prompt.

In some embodiments, machine learning models as described herein may learn to apply different weights to data in a prompt for generation of answer data. For example, system 100 may provide a prompt to a machine learning model, and the machine learning model may be configured to weigh the information in the prompt differently depending on the data domain level that was selected. As an example, information in the first domain, the user question, may be weighted more heavily than information from the fourth data domain, conversations in the extended reality environment. In such an example, the conversations in the extended reality environment may provide context to the machine learning model, but the model may apply a larger weight to the student question. The model may be instructed or may learn to place such weighting during inference, such as when the model may be executed or called upon to generate a predictive output (e.g., the output of the model such as the generation of the answer data).

The selection and weighing of information used by the machine learning model to generate answer data as described herein may reduce machine learning model hallucination, leading to improved model outputs relative to existing techniques. For example, by starting with model input data from a first data domain (e.g., the user question) and incrementally extracting data from one or more additional domains, the model may be trained on answer data which may be more accurate to the context (e.g., because the information is in nearby video players or objects) and only use additional information as necessary (e.g., as information in the internet may be unverified), which also may prevent wasting computing resources on unnecessary information. The model may not need to proceed to additional data domains if the generated answer data may be determined to be sufficient, thereby reducing the dependence of the model on unverified data and preventing hallucinations that result from conflating different contexts and data sources.

In some examples, generating answer data based on additional data domains may involve evaluating at least one confidence metric or threshold associated with the generated answer data. A confidence metric may correspond to answer data such that the confidence metric may be an evaluation of answer data (e.g., may indicate an amount of model confidence in answer data). Some disclosed embodiments involve one or more confidence metrics, such as different confidence metrics corresponding to different answer data (e.g., different answers generated by a machine learning model). System 100, including any machine learning model as described herein, may receive a confidence metric, such as any measure of the accuracy and/or relevancy of the answer data. The confidence metric may also measure or estimate the prevalence of any hallucinated or uncertain answer data.

In some examples, the confidence metric may be determined based on a user or a user response. The confidence metric may be, may be based on, or may include, a user response received by system 100 such as a user response transmitted through a feedback module. For example, a user, such as user 205, may interact with a feedback module within the extended reality environment 105 to provide a response corresponding to a measure of confidence (e.g., a slider indicating a percentage). The confidence metric may be evaluated and compared to a certain threshold, such as a predetermined or user-determined threshold for the relevancy of the generated answer data. For example, the confidence metric can be evaluated by system 100, such as by machine learning model 140. In some examples, the threshold may be adjusted, such as to lower the threshold or increase the threshold (e.g., guide the model to generate answer data with increased accuracy confidence and increased confidence that generated answer data has reduced hallucinations). The threshold can be adjusted by user 205 in some examples (e.g., through a feedback module), thereby enabling user 205 to control training or updating of the model. As an example, if the confidence metric does not satisfy or meet the threshold, the model may incrementally utilize additional data domains. For example, if the answer data generated based on a first data domain has a corresponding confidence measurement that does not satisfy a confidence threshold (e.g., the generated answer data may fail to reach a threshold of relevancy or accuracy), the machine learning model may access a second domain and use (e.g., use as training data, use as validation data, use as input data to a trained machine learning model) the second data domain to generate updated answer data. As described herein, the evaluation of whether the confidence metric satisfies or does not satisfy the threshold may be determined by a machine learning model, such as machine learning model 140. The updated answer data may be evaluated to determine if the associated confidence metric satisfies the threshold. Similarly, the machine learning model may train and generate answer data based on incrementally included data domains as determined based on evaluations of the confidence metric. As such, it will be appreciated that in some examples, the machine learning model does not necessarily utilize higher data domains unless the generated answer data does not meet the threshold, thereby conserving resources and reducing hallucinations.

FIG. 5 illustrates a diagram for training and using a machine learning model, consistent with embodiments of the present disclosure. Inputs 505 to machine learning model 510 (e.g., machine learning model included in system 100) may include at least one of a prompt, a text transcript, or a selected data domain. For example, inputs 505 may include a prompt which may include information based on the query and the at least one extended reality component identified in the extended reality environment. Input 505 may further include any one or more of the data domains 405-430. Inputs 505 may also include user preferences, user history information, or any contextual digital information. Inputs 505 may be transmitted to machine learning model 510. Performing machine learning may involve training 515 and/or prediction 520. Training 515 (e.g., training a large language model) may include one or more of adjusting parameters (e.g., parameters of the model), removing parameters, adding parameters, generating functions, generating connections (e.g., neural network connecting), or any other machine training operation. In some embodiments, training may involve performing iterative and/or recursive operations to improve model performance.

For example, input 505 may be transmitted to the machine learning model 510 from an extended reality environment, such as extended reality environment 105, and the machine learning model 510 may perform a search within the input 505 to identify the answer. Machine learning model 510 may also access additional information within the extended reality environment 105 as input. For example, the machine learning model 510 may access virtual reality objects, such as objects 115A-115C in the extended reality environment 105 that may not have been included in the input 505 to gain additional context to a query.

In some embodiments, machine learning model 510 may be a large language model which may be publicly accessible. For example, machine learning model 510 may be a LLM accessible to the public, such as machine learning models which have already been trained. In such examples, training 515 may involve providing the inputs 505 to the machine learning model 510. Thus, the machine learning model 510 may be adapted to include specific, relevant information, such as information contained within the data domains transmitted to the machine learning model 510. For example, training the machine learning model 510 based on the first domain may refer to adjusting parameters in the machine learning model 510 based on the first domain. Similarly, machine learning model 510 may be trained with any data domain, such as the second data domain, the third data domain, the fourth data domain, and/or the fifth data domain. It will be appreciated that by providing the user query and data domain to the machine learning model 510 during training, the machine learning model 510 may access more data that may have been previously unfamiliar to the machine learning model 510, thereby expanding model training and improving in the functioning of the machine learning model 510.

In some embodiments, training 515 of machine learning model 510 may refer to providing contextual data for a prompt or query to the machine learning model 510. For example, transmitting inputs such as a data domain may provide background for a question asked to the machine learning model 510. As such, training 515 may involve guiding the machine learning model 510 towards a certain output by limiting the scope of the machine learning model 510 (e.g., limiting model connections, limiting model nodes, limiting model layers). Prediction 520 may refer to generating a prediction with machine learning model 510. Prediction 520 may refer to inference. In an example, prediction 520 may refer to using machine learning model 510 to predict the next word in a sequence of words, such as phrase or a sentence.

Machine learning model 510 may be configured to generate one or more outputs 525. Some disclosed embodiments involve generating answer data corresponding to a prompt by querying machine learning model 510 with the prompt. Generating answer data may refer to the machine learning model 510 generating a response to a query. For example, when prompted with a query for a video lecture or an object in an extended reality environment, machine learning model 510 may generate an answer to the query while using data domains or a text transcript provided to the machine learning model 510 such that the answer may be more relevant to the material in the video lecture or the extended reality environment. In some examples, output 525 may be generated based on information in a data domain, such as data domains 405-430, provided to the machine learning model 510. The machine learning model 510 may generate answer data based on one or more data domains 405-430, such as determining whether a data domain includes answer data for (e.g., associated with, correlated with, relevant to) a given prompt. For example, the machine learning model 510 may search for an answer to a question in a designated data domain and then output answer data by generating natural language (e.g., a phrase or sequence of words) corresponding to the answer data. For example, a LLM can adjust, enhance, or optimize answer data found in a data domain by altering, rephrasing, or reorganizing the answer data such that the answer data may be presented in a more suitable manner for answering a given prompt. In another example, the machine learning model 510 may generate answer data by searching all data domains for answer data, and then organize the answer data to a format which can answer the prompt. For example, the machine learning model 510 may limit the answer data to only answer data found in a specific data domain (e.g., when asked to limit the data by a user). It will be appreciated that for any data domain, the machine learning model 510 may identify answer data in the data domain and any other data domains included. As such, the machine learning model 510 may be configured to utilize local context (e.g., data from a first data domain) alongside external data (e.g., data from the internet).

It will be appreciated that aspects of generating answer data based on data domains and/or a transcript may improve natural-language based machine learning model training and accuracy by reducing the amount of hallucinations produced by generative artificial intelligence, such as LLMs. It will be recognized that hallucination including outputs which may not be real or may not match data or patterns a model has been trained on (e.g., nonsensical or false outputs) can be detrimental to the use of a machine learning model. By providing and training on extended reality environments and data domains, disclosed embodiments may reduce hallucinations by restricting a machine learning model, thereby enabling the model to generate answer data better corresponding to information within data domains. For example, LLM hallucination may present the problem of generating irrelevant, inaccurate, or out of context answer data. Further, training or using machine learning models based on data which may include hallucinated information may result in further hallucinations in the models. It will also be recognized that model hallucination may present significant detriments in the field of education, such as when students utilize LLMs for educational purposes. As the student may be unfamiliar with the topic they are learning about, when they prompt an LLM and receive hallucinated data from the LLM, the students may be likely to trust the hallucinated data, thereby learning wrong information. Thus, LLM hallucination may contribute to the spread of misinformation. For example, an LLM may hallucinate when they encounter a query that was not originally in the scope of the training data. However, by providing specific data domains as described herein, the LLM may be presented with authentic context and information that it may use to generate answer data. By reducing the amount of irrelevant data for use by an LLM, this also reduces the usage of electronic processing and storage for LLM operation.

Some embodiments may involve a step 530 of updating the machine learning model 510. In some examples, updating the machine learning model 510 may involve reconfiguring weights in the machine learning model 510, such as in a neural network model. Updating the machine learning model 510 may involve generating answer data based on different data domains, such as if the machine learning model 510 cannot find answer data for a given prompt in a first data domain, the machine learning model 510 may utilize higher data domains provided to the machine learning model 510, including transmitting data domains through an application. For example, if the machine learning model 510 determines there may not be answer data for a given a question about a video lecture in the closest-video player (e.g., a second data domain 410), the machine learning model 510 may be updated by accessing a third data domain (e.g., other video players, which may be a form of third data domain 415), and generating answer data based on the third data domain 415 and the second data domain 410. In an example, if the machine learning model 510 determines there may not be answer data in the third data domain 415, the machine learning model 510 may train on a fourth data domain 420, and generate answer data based on the first data domain 405, the second data domain 410, the third data domain 415, and the fourth data domain 420.

In some embodiments, updating the machine learning model 510 may involve feedback, such as feedback from a user, such as user 205. For example, system 100 may receive feedback regarding the accuracy of generated answer data, including the relevancy of the answer data to a prompt. For example, system 100 may receive feedback from a user 205, and the feedback may be transmitted to the machine learning model 510. The feedback may involve a determination that the generated answer data was not satisfactory to a user (e.g., based on user input, based on a user reaction), and the feedback may trigger the machine learning model 510 to regenerate the answer data by updating the machine learning model 510 (such as by utilizing information from different data domains). For example, if system 100 receives feedback that a generated answer did not sufficiently address a prompt, the machine learning model 510 may utilize additional data domains to generate updated answer data, and extract information from the additional data domains to improve the updated answer data. Additional data domains may be utilized as necessary depending on iterative feedback. It will be appreciated that in engaging with feedback, the machine learning model 510 may learn which data domains contain the information most helpful to answering different questions within different respective contexts, thereby enabling faster, more efficient generation of the relevant answer data as the machine learning model 510 predicts which additional data domains to retrieve data from (which may also enable the model to conserve resources as less data may be held in the system's short term memory).

Figure 6:
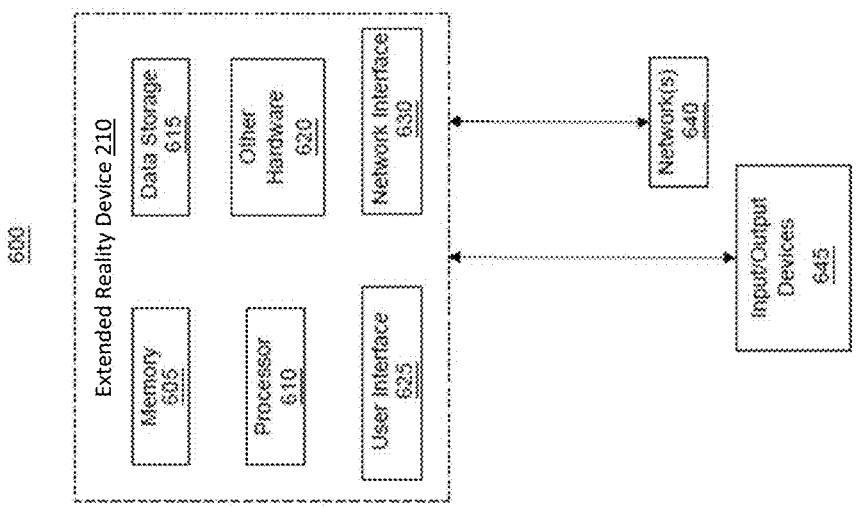
FIG. 6 is a block diagram illustrating an exemplary operating environment for implementing various aspects of this disclosure, according to some embodiments of the present disclosure.

FIG. 6 is a block diagram of an operating environment 600 of extended reality device 210 for implementing various aspects of the present disclosure. As illustrated in FIG. 6, components of extended reality device 210 may include, but are not limited to, various hardware components, such as a system memory 605, one or more processors 610, data storage 615, other hardware 620, one or more I/O devices 645, a user interface 625, a network interface 630, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Extended reality device 210 may include at least one logical processor 610. The at least one logical processor 610 may include circuitry and transistors configured to execute instructions from memory (e.g., memory 605). For example, the at least one logical processor 610 may include one or more central processing units (CPUs), arithmetic logic units (ALUs), Floating Point Units (FPUs), and/or Graphics Processing Units (GPUs). The extended reality device 210, like other suitable devices, may also include one or more computer-readable storage media, which may include, but are not limited to, memory 605 and data storage 615. In some embodiments, memory 605 and data storage 615 may be part a single memory component. The one or more computer-readable storage media may also be of different physical types. The media may be volatile memory, non-volatile memory, fixed in place media, removable media, magnetic media, optical media, solid-state media, and/or of other types of physical durable storage media (as opposed to merely a propagated signal). Some other examples of computer-readable storage media may include built-in random access memory (RAM), read-only memory (ROM), hard disks, and other memory storage devices which are not readily removable by users (e.g., memory 605).

The data storage 615 or system memory 605 may include computer storage media in the form of volatile and/or nonvolatile memory such as ROM and RAM. A basic input/output system (BIOS), containing the basic routines that help to transfer information between elements within extended reality device 210, such as during start-up, may be stored in ROM. RAM may contain data and/or program modules that are immediately accessible to and/or presently being operated on by processing unit. By way of example, and not limitation, data storage 615 may hold an operating system, application programs, and other program modules and program data.

Data storage 615 may also include other removable/non-removable, volatile/nonvolatile computer storage media. By way of example only, data storage 615 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Although an embodiment may be described as being implemented as software instructions executed by one or more processors in a computing device (e.g., general-purpose computer, server, or cluster) or an extended reality device, such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 610, memory 605, and data storage 615, an operating environment 600 may also include other hardware 620, such as batteries, buses, power supplies, wired and wireless network interface cards, for instance. In some embodiments, input/output devices 645 such as human user input/output devices (screen, keyboard, mouse, tablet, microphone, speaker, motion sensor, glove, tactical receptor, etc.) may be present in operable communication with one or more processors 610 and memory 605. A user such as user 205 may interact with the extended reality environment through extended reality device 210 by using one or more I/O device 645, such as a display, keyboard, mouse, microphone, touchpad, camera, sensor (e.g., touch sensor) and other devices, via typed text, touch, voice, movement, computer vision, gestures, and/or other forms of input/output.

Extended reality device 210 may further be configured to present at least one user interface 625. A user interface 625 may support interaction between an embodiment and user 205. A user interface 625 may include one or more of a command line interface, a graphical user interface (GUI), natural user interface (NUI), voice command interface, and/or other user interface (UI) presentations, which may be presented as distinct options or may be integrated. A user may enter commands and information through a user interface 625 or other I/O devices 645 such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). User interface 625 may include one or more toggles or controls which a user can interact with or operate. In some embodiments, the extended reality environment displayed by extended reality device 210 may change based on (e.g., in response to, derived from, dependent upon) interactions with the user interface 625. For example, the extended reality environment may change based on an interaction with a button, control, icon, or toggle displayed in the user interface 625. An interaction with user interface, 625 may include gestures such as hovers, clicks, long presses, or the like, and interactions may be executed by a user in some examples.

Other computerized devices and/or systems not shown in FIG. 6 may interact in technological ways with extended reality device 210 or with another system using one or more connections to a network, such as network 640, via a network interface 630, which may include network interface equipment, such as a physical network interface controller (NIC) or a virtual network interface (VIF).

Figure 7:
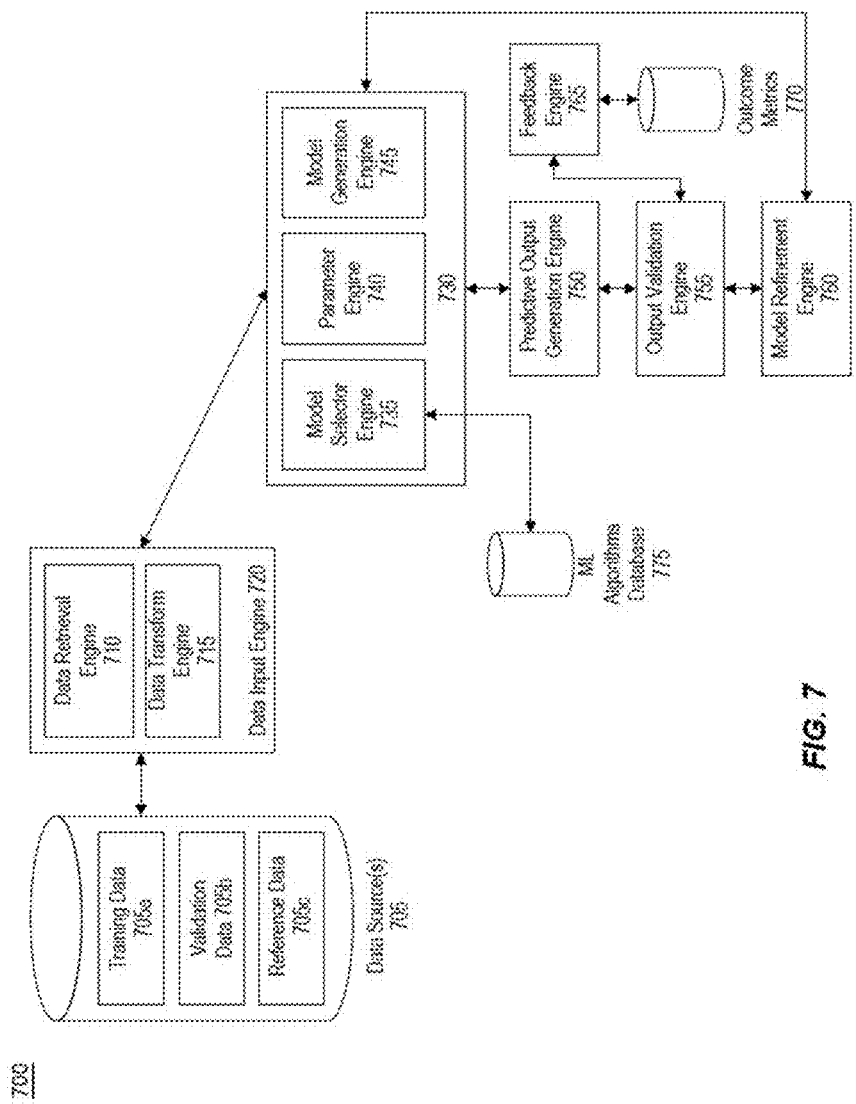
FIG. 7 is a block diagram illustrating an exemplary machine learning platform for implementing various aspects of this disclosure, according to some embodiments of the present disclosure.

FIG. 7 is a block diagram illustrating an exemplary machine learning platform for implementing various aspects of this disclosure, according to some embodiments of the present disclosure. System 700 may include data input engine 720 that can further include data retrieval engine 710 and data transform engine 715. Data retrieval engine 710 may be configured to access, interpret, request, or receive data, which may be adjusted, reformatted, or changed (e.g., to be interpretable by other engine, such as data input engine 720). For example, data retrieval engine 710 may request data from a remote source using an API. Data input engine 720 may be configured to access, interpret, request, format, re-format, or receive input data from data source(s) 705. For example, data input engine 720 may be configured to use data transform engine 715 to execute a re-configuration or other change to data, such as a data dimension reduction. Data source(s) 705 may exist at one or more memories 605 and/or data storages 615. In some embodiments, data source(s) 705 may be associated with a single entity (e.g., organization) or with multiple entities. Data source(s) 705 may include one or more of training data 705a (e.g., input data to feed a machine learning model as part of one or more training processes), validation data 705b (e.g., data against which at least one processor may compare model output with, such as to determine model output quality), and/or reference data 705c. For example, training data 705a, validation data 705b, and/or reference data 705c may include data domains, as described herein. In some embodiments, data input engine 720 can be implemented using at least one computing device or extended reality device. For example, data from data sources 705 can be obtained through one or more I/O devices and/or network interfaces. Further, the data may be stored (e.g., during execution of one or more operations) in a suitable storage or system memory. Data input engine 720 may also be configured to interact with data storage 615, which may be implemented on a computing device that stores data in storage or system memory.

System 700 may also include machine learning (ML) modeling engine 730, which may be configured to execute one or more operations on a machine learning model (e.g., model training, model re-configuration, model validation, model testing), such as those described in the processes described herein. In an example, machine learning modeling engine 730 may include machine learning model 140, as disclosed herein with respect to FIG. 1. For example, ML modeling engine 730 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 705a) through a machine learning model process (e.g., a training process). In some embodiments, different epochs may have different degrees of supervision (e.g., supervised, semi-supervised, or unsupervised). Data input to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters.

ML modeling engine 730 may include model selector engine 735 (e.g., configured to select a model from among a plurality of models, such as based on input data), parameter selector engine 740 (e.g., configured to add, remove, and/or change one or more parameters of a model), and/or model generation engine 745 (e.g., configured to generate one or more machine learning models, such as according to model input data, model output data, comparison data, and/or validation data). ML algorithms database 775 (or other data storage 615) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 700 can further include predictive output generation engine 750, output validation engine 755 (e.g., configured to apply validation data to machine learning model output), feedback engine 765 (e.g., configured to apply feedback from a user and/or machine to a model), and model refinement engine 760 (e.g., configured to update or reconfigure a model). In some embodiments, feedback engine 765 may receive input and/or transmit output (e.g., output from a trained, partially trained, or untrained model) to outcome metrics database 770. Outcome metrics database 770 may be configured to store output from one or more models and may also be configured to associate output with one or more models. In some embodiments, outcome metrics database 770, or other device (e.g., model refinement engine 760 or feedback engine 765) may be configured to correlate output, detect trends in output data, and/or infer a change to input or model parameters to cause a particular model output or type of model output. In some embodiments, model refinement engine 760 may receive output from predictive output generation engine 750 or output validation engine 755. In some embodiments, model refinement engine 760 may transmit the received output to ML modelling engine 730 in one or more iterative cycles.

Any or each engine of system 700 may be a module (e.g., a program module), which may be a packaged functional hardware unit designed for use with other components or a part of a program that performs a particular function (e.g., of related functions). Any or each of these modules may be implemented using a computing device or an extended reality device. In some embodiments, the functionality of system 700 may be split across multiple computing devices to allow for distributed processing of the data, which may improve output speed and reduce computational load on individual devices. In some embodiments, system 700 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 700 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 8:
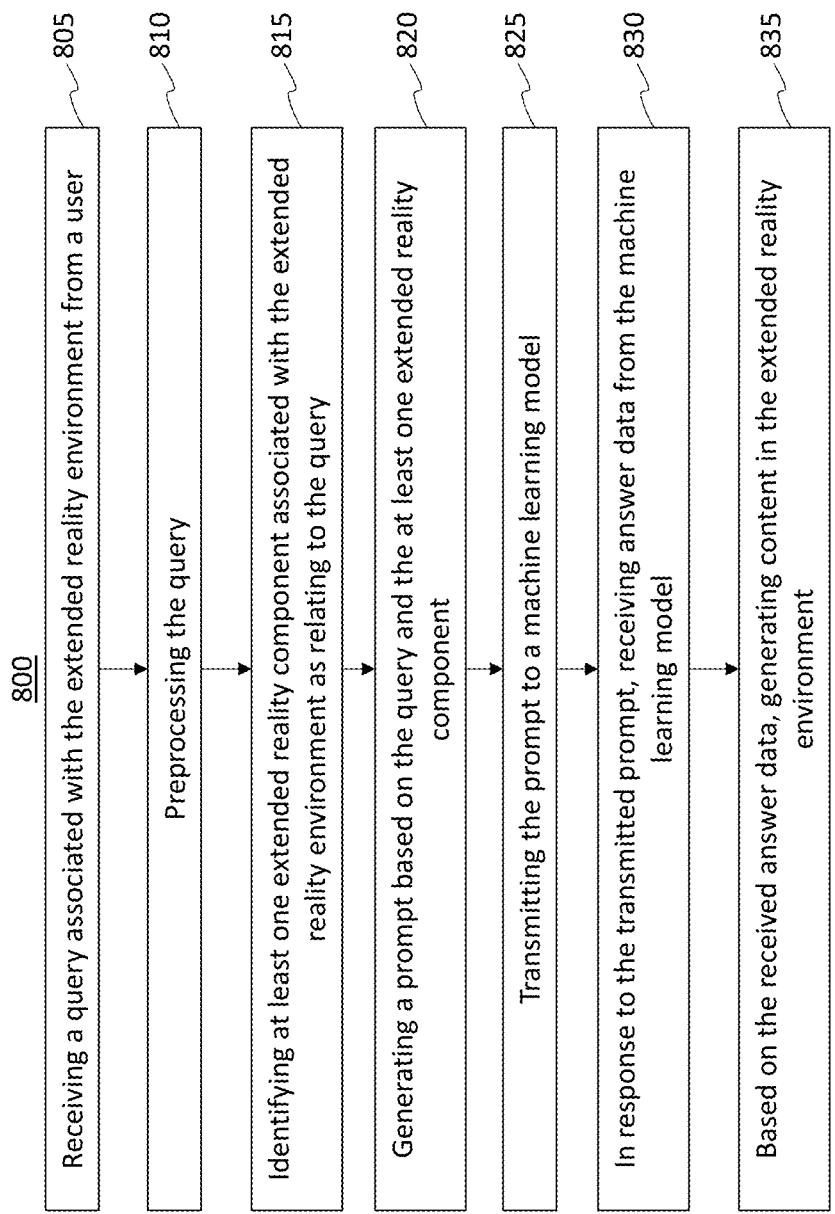
FIG. 8 is a flow diagram of a method, consistent with embodiments of the present disclosure.

FIG. 8 displays a process 800 for causing a machine learning model to generate improved answer data based on an extended reality environment. In accordance with disclosed embodiments, process 800 may be implemented by extended reality device 210 depicted in FIG. 2, or any type of extended reality environment. For example, process 800 may be performed by at least one processor (e.g., processor 610), memory (e.g., memory 605), and/or other components of extended reality device 210, or by any computing device. In some embodiments, different parts of process 800 may be performed by different devices Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Step 805 of process 800 may include receiving a query associated with an extended reality environment from a user. A user, such as user 205 may interact with an extended reality environment, such as extended reality environment 105 through an extended reality device, such as extended reality device 210. In some embodiments, user 205 may input (e.g., ask) a query in extended reality environment 105 (e.g., through user rendering 220). The query by user 205 may be asked verbally, in writing, based on a gesture or other user interactions with the extended reality environment 105, or through any other medium appropriate for asking a query. The query by the user 205 may be related to any extended reality component present in the extended reality environment 105, such as one or more of virtual reality object 235, a video or audio recording, a lecture, a conversation with another user, a conversation with virtual character 225, an object in the physical environment of user 205, or any other elements in the extended reality environment 105, or any combination thereof. A query may include at least one of a text input, auditory input, touch input, or a motion input (e.g., a motion of a user detected by a device, such as a pointing or grabbing motion). For example, a user may point to or hold a virtual object (e.g., object 115C) in a virtual reality environment and/or verbally ask a question, which may be detected by a device (e.g., a microphone included in and/or connected to extended reality device 210).

Step 810 of process 800 may include preprocessing the query associated with the extended reality environment, such as extended reality environment 105, from a user, such as user 205. Preprocessing a query may comprise preparing data (e.g., data extracted from the query) for presentation to a machine learning model. In some embodiments, preprocessing may involve obtaining data and making adjustments and/or manipulations to the obtained data before input of the data into a machine learning model. Additionally or alternatively, preprocessing the query may include converting audio data to text data (e.g., using a speech-to-text operation). Additionally or alternatively, preprocessing may involve standardizing data such that the data may be input into a machine learning model. In some embodiments preprocessing may include extracting information from the query and reformulating the information into a data structure that is processable by a machine learning model but not understandable to a human. For example, preprocessing may include tokenizing portions of text for a machine learning model.

Step 815 of process 800 may include identifying at least one extended reality component associated with the extended reality environment 105 as relating to the query. In some embodiments, the at least one extended reality component may be at least one of an object (e.g., a virtual object), a recording, or transcript information. The query by user 205 may be related to an extended reality component, as disclosed herein with respect to Step 810. However, if user 205 does not explicitly state a subject of the query, then process 800 may identify the at least one virtual reality component as relating to the query. Identifying the at least one virtual reality component as related to the query may provide proper context and background information to the machine learning model about the query so that the machine learning model may provide relevant and targeted answer data.

In some embodiments, identifying the at least one extended reality component may comprise determining that the extended reality component is rendered in closest proximity to the user rendering 220 in the extended reality environment 105 relative to at least one other extended reality component. Extended reality environment 105 may extend for a long virtual distance (e.g., infinitely around user rendering 220) and may contain any number of extended reality components. In some embodiments, the extended reality component related to the user query may be identified by determining which extended reality component is located closest to the user rendering 220 in extended reality environment 105. For example, process 800 may determine that the user rendering 220 is more likely to be asking a question about an extended reality component that is closest to the user rendering 220 in extended reality environment 105. Therefore, the extended reality component that is relevant to the query may be identified by determining which extended reality component is rendered closest to the user rendering 220 in extended reality environment 105.

In other embodiments, identifying at the at least one extended reality component may comprise identifying at least one object in the extended reality environment that the user interacted with prior to receiving the query. For example, user 205 (represented as user rendering 220 within extended reality environment 105) may interact with objects in extended reality environment 105, such as virtual reality object 235 or a recording (e.g., audio recording, video recording, audio-video recording, and/or computer-generated recording). In some embodiments, a user may interact with virtual reality object 235 or a video or audio recording through a gesture-based interaction (e.g., detectable by a motion sensor or other component of extended reality device 210), through a keyboard, a mouse, or any other input/output devices (e.g., any of input/output devices 645) configured to allow user interaction with the extended reality environment. In other embodiments, an interaction with virtual reality object 235 or a recording may include one or more gestures such as pointing actions, grabbing actions, holding actions, hovers, clicks, long presses, or the like. User 205 may ask a query about a virtual reality component that the user recently interacted with. In some embodiments, identifying the at least one virtual reality component that is the subject of the user query may include identifying a virtual reality object that the user recently interacted with.

In some embodiments, identifying the at least one extended reality component may comprise identifying an object (e.g., virtual object) that the user 205 is viewing and/or virtually holding. As disclosed above, user 205 may interact with virtual reality objects (e.g., interactions which may be represented, mimicked, and/or facilitated with user rendering 220), such as virtual reality object 235 in extended reality environment 105. In some embodiments, user 205 may be looking at a specific virtual reality component in extended reality environment 105. In other embodiments, the user rendering 220 may be virtually holding a virtual reality object. The user query may be related to the virtual reality object that the user rendering 220 is viewing and/or virtually holding. In some embodiments, identifying the at least one extended reality component may include identifying an object that the user is viewing and/or virtually holding. Additionally or alternatively, identifying the at least one extended reality component may include identifying an object that the user is pointing to.

In some embodiments, identifying the at least one extended reality component may include identifying a most recent timestamp corresponding to a point at which the user 205 paused a recording. The extended reality component that is the subject of the user query may be a recording (e.g., audio recording, video recording, audio-video recording, and/or computer-generated recording) playing (or loaded and/or paused) in extended reality environment 105. User 205 may be watching or listening to the recording in extended reality environment 105 (e.g., as the recording is rendered by extended reality device 210) and may pause the recording at a certain point. The query by the user 205 related to the extended reality environment 105 may involve a query about the recording that user 205 was watching or listening to. In some embodiments, the at least one extended reality component may be identified by determining the most recent timestamp in the recording that corresponds to a place in the recording where user 205 paused the recording. Additionally, identifying the at least one extended reality component may include identifying multiple timestamps corresponding to multiple points at which the user 205 paused one or more recordings. For example, multiple recordings may be loaded or rendered within extended reality environment 105, and may have different timestamps (e.g., pause points) associated with them.

In other embodiments, identifying the at least one extended reality component may include identifying a most recent recording of an interaction with a second user in the extended reality environment. For example, in some embodiments, the at least one extended reality component may comprise an interaction between user 205 and a second user in the extended reality environment 105 (or, in the case of second human user, in a physical environment). The second user may include another live human in extended reality environment 105 (or, in the case of second human user, in a physical environment) or a virtual character, such as virtual character 225. User 205 may verbally talk to the second user or may communicate with the second user through writing (e.g., typing), and/or a gesture. For example, a query received (e.g., at step 805) may include a query from user 205 about an interaction with the second user. In such an embodiment, identifying the at least one virtual reality object may include identifying an audio or written record of the interaction with the second user.

Step 820 of process 800 may include generating a prompt based on the query and the at least one extended reality component. The query may provide a question that the user 205 is seeking to receive an answer to. In some embodiments, process 800 may include extracting context and background information related to the query from the at least one identified extended reality component (e.g., to influence engineering of the prompt). Generating the prompt may comprise converting the query and the at least one extended reality component into a format that may be readable and understood by a machine learning model. For example, in some embodiments, generating a prompt may include converting the query and the at least one extended reality component into a text representation and/or token. In some embodiments, the prompt may be based on the query presented by the user 205 and at least two extended reality components associated with a same extended reality session. For example, at step 815 of process 800, at least two extended reality components in the same extended reality session of the user 205 may have been identified as relevant to or the subject of the query of the user 205. The at least two extended reality components may include a virtual reality object 235, recording, transcript information, or any other elements in the extended reality session of the user. Process 800 may include analyzing the at least two extended reality components to extract relevant context and background information related to the query. In some embodiments, generating the prompt may include generating the prompt based on the query and the at least two extended reality components. For example, process 800 may include information related to the at least two extended reality components (e.g., identifiers or names of the at least two extended reality components) in the generated prompt.

Additionally or alternatively, generating the prompt may include generating the prompt based on a user trait, such as an identified age, grade level, experience level, or qualification of the user 205. For example, process 800 may use an age or grade level of the user 205 as a parameter (e.g., constraint) when determining relevant information to provide in response to the prompt to ensure that the answer data received from the machine learning model contains the suitable level of simplicity, complexity, and/or relevance. For example, a more complex answer to a query may be more appropriate for an older user or a user in a higher grade level than a younger user or a user in a lower grade level. Process 800 may determine a user trait based on at least one of prior interactions of the user with the extended reality environment, the query, a level of vocabulary of the user, a name of a course, a course code, information included in a module (e.g., an information module associated with an extended reality environment session), or an institution name associated with a system rendering the extended reality environment. Prior interactions of the user with the extended reality environment may include any interactions that have occurred between the user and the extended reality environment (e.g., recorded and/or analyzed by extended reality device 210). For example, prior interactions may include viewing or virtually holding virtual reality objects in the extended reality environment, audio input (e.g., detected verbal questions), viewing and/or listening to recordings, interacting with a virtual character, prior queries (e.g., as discussed further below), or other user in the extended reality environment, or any other interactions that a user may have with an extended reality environment. The types of interactions that a user has with the extended reality environment may identify a user trait (e.g., an age or grade level of the user) based on the complexity or simplicity of the interactions. The query of the user may also indicate a user trait (e.g., an age or grade level) of the user. For example, if the query is about complex or high-level subject matter then process 800 may detect an indication of an older age or higher grade level of the user. If the query is about a simple or basic subject level, then process 800 may detect an indication of a younger age or lower grade level of the user. The level of vocabulary of the user may also indicate the age or grade level of the user. For example, the use of more complex vocabulary may indicate an older age or higher grade level of the user, while more simplistic vocabulary may indicate a younger age or lower grade level of the user. A name of the course, a course code, or an institution name associated with a system rendering the extended reality environment may also indicate the age or grade level of the user. For example, the extended reality environment may be rendered by a system associated with a specific institution, such as a grade school, a high school, a university, or any other institution. The extended reality environment may be associated with a course, a course code, or a name of the institution that is rendering the extended reality environment. The name of the course, a course code identifying the course, or the institution name may further indicate the age or grade level of a student. For example, if the extended reality environment is associated with a grade school, then that may indicate a younger age or lower grade level of the user. If the extended reality environment is associated with a university, then that may indicate an older age or higher grade level of the user. By identifying the age or grade level of the student when generating the prompt, the prompt may provide additional relevant information regarding the query. This may allow the machine learning model receiving the prompt to provide more relevant and targeted answer data by providing answer data at an appropriate age level or grade level.

In other embodiments, generating the prompt may further comprise generating the prompt based on a query previously received from the user 205. In some embodiments, the user 205 may ask multiple queries on the same or different topics. Process 800 may determine, based on queries that have been previously received from the user 205, additional context and background to the present query received from the user 205. For example, the query presently received by the user 205 may include a question related to a previous query. The previous query and answer data received in response to the previous query may provide context and background information to the machine learning model (e.g., a machine learning model associated with or implementing all or part of process 800) to allow the machine learning model to generate new answer data that is responsive to the present query. In such an embodiment, the prompt may include both the present query and the prior query received from the user 205 to provide context to the present query.

In some embodiments, the extended reality environment 105 may comprise a view of the physical environment of the user 205 and at least one virtual reality object (e.g., an augmented reality view). In such an embodiment, the user 205 may view at least one virtual reality object overlaid over the physical environment of the user 205. In such an embodiment, the query received by the user 205 may be related to at least one object in the physical environment of the user 205. Process 800 may identify the at least one object in the physical environment of the user 205 as relevant to the query. Identifying the at least one object in the physical environment of the user 205 may correspond to identifying at least one virtual reality component associated with the extended reality environment 105, as disclosed herein with respect to step 815 of process 800. In some embodiments, process 800 may generate the prompt based on the query and at least one object in the physical environment of the user 205. In some embodiments, process 800 may include extracting context and background information related to the query from the at least one identified extended reality component, upon which the prompt may be based (e.g., to influence engineering of the prompt). By analyzing a broad range of digital information from an extended reality environment and configuring relevant information for the prompt, process 800 improves the quality of machine learning model output.

Step 825 of process 800 may include transmitting the prompt to a machine learning model. Transmitting the prompt may refer to transmitting, transferring, or providing (e.g., across a network) data or information. For example, process 800 may transmit the pre-processed prompt that may include the user query, and, optionally, background information and context such as the at least one virtual reality object, to a machine learning model. The machine learning model may be able to determine and/or generate answer data based on the generated prompt, which may direct the machine learning model to output improved answer data (e.g., more relevant, more appropriate, more tailored) compared to a prompt generated without the benefit of disclosed embodiments. Improved answer data may not only benefit the user (e.g., enhance learning or information exchange), but may also benefit system components, such as by reducing processing and/or memory loads, which may be created by follow-up queries (e.g., prompted by machine learning model hallucinations). The machine learning model may include a large language model, as described herein. Transmitting the prompt may further include providing the prompt as input to the machine learning model.

Step 830 of process 800 may include receiving answer data from the machine learning model in response to (e.g., based on, dependent upon, or associated with) the transmitted prompt. Answer data may comprise information identified by the machine learning model as responding to the query presented by the user 205. The machine learning model may adjust, enhance, or optimize answer data such that the answer data may be presented in a suitable manner for answering the prompt. For example, the machine learning model can adjust, enhance, or optimize answer data found in a first domain by altering, rephrasing, or reorganizing the answer data such that the answer data may be presented in a more suitable manner for answering a given prompt. In another example, the machine learning model may generate answer data by searching a higher data domain (e.g., the second, third, fourth, or fifth data domains) for answer data, and then organize the answer data to a format to answer the prompt (e.g., using natural language generation). For example, the machine learning model may limit the answer data to only answer data found in a particular data domain (e.g., when asked to limit the data by a user). It will be appreciated that for any data domain, the machine learning model may identify answer data in the data domain and any other data domains included. As such, the machine learning model may be configured to utilize local context (e.g., data from a first data domain) alongside external data (e.g., data from the internet). Receiving answer data from the machine learning model may comprise receiving the answer data in a natural language format over a network.

Step 835 of process 800 may include generating content (e.g., virtual content) in the extended reality environment 105 based on the received answer data. Content may include at least one of an animation, a video, an audio sequence (e.g., computer-generated language), an image, text, or a visualization. In some embodiments, generated virtual content may be associated with one or more real world objects. For example, a generated virtual outline (e.g., bounding box), may be rendered to appear around a real world object (e.g., in an augmented reality environment). Extended reality environment 105 may present the answer data received in response to the prompt to the user 205 in a variety of ways. In some embodiments, generating content based on the received answer data may comprise rendering a text display in the extended reality environment. For example, in such an embodiment, extended reality environment 105 may render the answer data for presentation to the user 205 in the form of readable text in the extended reality environment 105. In other embodiments, generating content in the extended reality environment 105 may include playing an audio recording based on the answer data. In such an embodiment, extended reality environment 105 may play the answer data as an audio recording into the extended reality environment 105 for the user 205 to hear (e.g., via a speaker, which may be integrated with and/or connected to a headset) the answer data (or information based on the answer data). In some embodiments, extended reality environment 105 may play the audio recording through a virtual character, such as virtual character 225. In such an embodiment, extended reality environment 105 may animate virtual character 225 to correspond to the audio recording of the answer data such that it appears that virtual character 225 is answering the query of the user 205. In other embodiments, generating content in the extended reality environment may comprise rendering a virtual reality object, based on the answer data, in the extended reality environment. For example, in such an embodiment, the answer data may be related to a virtual reality object that is rendered by extended reality environment 105 and displayed to the user 205. Rendering a virtual reality object based on the answer data may provide a visual representation of the answer data which may allow the user to better understand the answer data. In other embodiments, extended reality environment 105 may render an arrow, a highlight, an outline, a box, a circle, or any other visual element around, near, or directed to an existing virtual reality object (or physical object) in the extended reality environment 105. Visual elements such as these may emphasize a portion of or an entire virtual reality object that has already been rendered in the extended reality environment 105 based on the answer data. For example, if the query of the user 205 is related to a virtual reality object in the extended reality environment 105, generating content based on the received answer data may include emphasizing a portion of or the entire existing virtual reality object.

Figure 9:
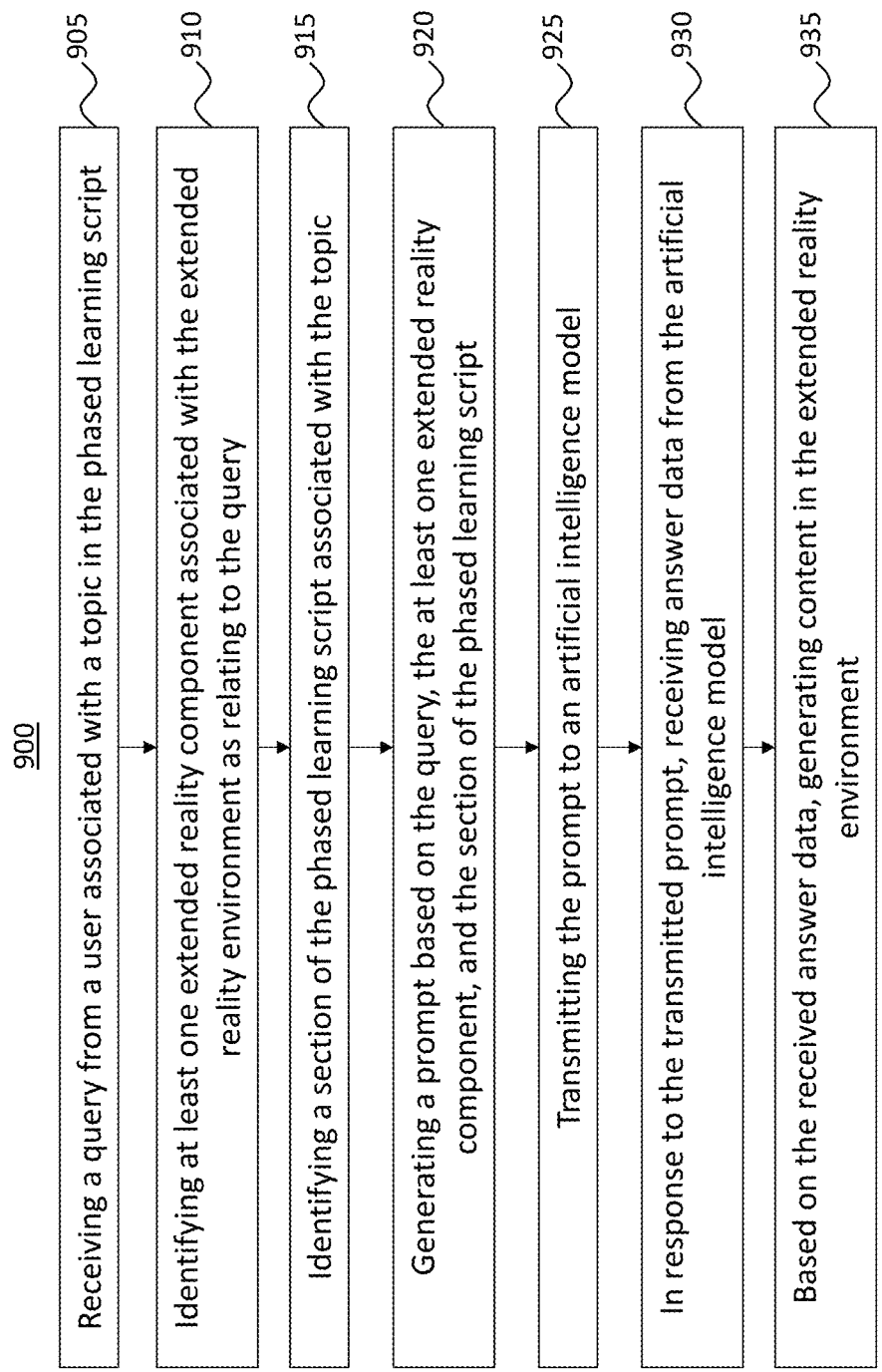
FIG. 9 is a flow diagram of a method for generating prompts based on a phased script in an extended reality environment, consistent with embodiments of the present disclosure.

FIG. 9 illustrates a process 900 for generating prompts based on a phased script in an extended reality environment. In accordance with disclosed embodiments, process 900 may be implemented by extended reality device 210 depicted in FIG. 2, or any type of extended reality device. For example, process 900 may be performed by at least one processor (e.g., processor 610), memory (e.g., memory 605), and/or other components of extended reality device 210, or by any computing device. In some embodiments, different parts of process 900 may be performed by different devices Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel. Process 900 may occur through (e.g., using, during) a single continuous rendering of an extended reality environment, such as extended reality environment 105. For example, process 900 may occur automatically after user 205 asks a query without disruption to the rendering of extended reality environment 105. It is appreciated that portions of process 800 and 900 may be combined. For example, identifying at least one extended reality component in process 900 may include features described with respect to identifying the at least one extended reality component in process 800.

Step 905 of process 900 may include receiving a query from a user associated with a topic in the phased script. A user, such as user 205, may interact with an extended reality environment, such as extended reality environment 105 through an extended reality device, such as extended reality device 210. In some embodiments, user 205 may input (e.g., ask) a query in extended reality environment 105 (e.g., through user rendering 220). The query by user 205 may be asked verbally, in a text input, based on a gesture or other user interactions with the extended reality environment 105, or through any other medium appropriate for asking a query. Process 900 may translate a verbal query into a text representation through speech recognition, such as through a speech-to-text model. The query by the user 205 may be related to any extended reality component present in the extended reality environment 105, such as one or more of virtual reality object 235, a topic in a phased script, a video or audio recording, a lecture, a conversation with another user, a conversation with virtual character 225, an object in the physical environment of user 205, or any other elements in the extended reality environment 105, or any combination thereof. A query may include at least one of a text input, auditory input, touch input, or a motion input (e.g., a motion of a user detected by a device, such as a pointing or grabbing motion). For example, a user may point to or hold a virtual object (e.g., object 115C) in a virtual reality environment and/or verbally ask a question, which may be detected by a device (e.g., a microphone included in and/or connected to extended reality device 210).

The query may be associated with a topic in a phased script. The phased script may comprise a pre-planned dialog that an artificial intelligence model virtual speaker or a human speaker may say. The phased script may be in text format and may comprise a combination of lines that a speaker may follow. In some embodiments, the phased script may be a lesson plan, which may facilitate the speaker's teaching of a topic to a student. In some embodiments, the phased script may be accessible only to the speaker (e.g., virtual speaker) and the user 205 may not be able to access the phased script (e.g., the script may not be configured, such as within application code, for output to a user interface). The phased script may comprise a plurality of sections. Each section of the phased script may be associated with a respective topic. For example, the phased script may include or be associated with metadata indicating topics for respective sections of the phased script. In some embodiments, the phased script may comprise an overall lesson plan associated with a subject (e.g., math, science, history, etc.). Each section of the phased script may be related to a specific topic within the subject. Each section of the phased script may further be related to other sections of the phased script. For example, a later section of the phased script may expand on or provide more detailed information related to an earlier section of the phased script. A speaker (e.g., a virtual speaker or a human speaker) may follow each section of a phased script in the order presented in the phased script when conducting a session in extended reality environment 105 with a user, such as user 205. In some embodiments, the speaker may use one or more virtual reality object 235, a video or audio recording, a lecture, a conversation with a virtual character 225, an object in the physical environment of user 205 or any other elements in the extended reality environment 105, or any combination thereof to explain the topic in the phased script.

In some embodiments, each section of the phased script may be associated with a bounded area (e.g., a zone) within the extended reality environment. For example, each section of the phased script may be associated with a specific, defined area within the extended reality environment. In some embodiments, each zone of the extended reality environment may comprise a bounded area that may be eighteen feet in length. In other embodiments, each zone of the extended reality environment may comprise a bounded area of any length or size. User 205 (through user rendering 220) may virtually move through each zone of the extended reality environment as user 205 completes each section of the phased script. In some embodiments, user 205 may be prevented from moving from a first zone to a second zone until user 205 has completed the section of the phased script (e.g., listened to, viewed, and/or completed at least one task, such as a quiz, in the extended reality environment) associated with the first zone. In some embodiments, extended reality objects (e.g., virtual reality object 235, virtual display 230, virtual character 225, etc.) may be generated within a zone as user 205 completes the section of the phased script associated with the zone. Each zone of the extended reality environment may include an identifying number, name, code, or any other form of identification.

Step 910 of process 900 may include identifying at least one extended reality component associated with the extended reality environment 105 as relating to the query. In some embodiments, the at least one extended reality component may be at least one of an object (e.g., a virtual object, a physical object represented in a video feed) or a recording. A speaker (e.g., a virtual speaker or a human speaker), user 205, or other components of process 900 may generate at least one extended reality component in extended reality environment 105 when following the phased script, which may enhance understanding of the topic of the phased script. The query by user 205 may be related to an extended reality component associated with the phased script, as disclosed herein with respect to Step 905. However, if user 205 does not explicitly state a subject of the query, then process 900 may identify the at least one extended reality component as relating to the query. Identifying the at least one virtual reality component as related to the query may provide proper context and background information to the artificial intelligence model about the query so that the artificial intelligence model may provide relevant and targeted answer data.

In some embodiments, identifying the at least one extended reality component may comprise determining that the extended reality component is rendered in (or, in the case of a physical object in an augmented reality environment, is present in) closest proximity to the user 205 in the extended reality environment 105 relative to at least one other extended reality component, as disclosed herein with respect to FIG. 8. In other embodiments, identifying the at least one extended reality component may comprise identifying an object in the extended reality environment 105 that the user 205 interacted with prior to receiving the query (e.g. within a threshold amount of time from the present), as disclosed herein with respect to FIG. 8. In other embodiments, identifying the at least one extended reality component may comprise identifying an object that the user 205 is viewing or virtually holding in the extended reality environment 105, as disclosed herein with respect to FIG. 8. In other embodiments, identifying the at least one extended reality component may comprise identifying a most recent timestamp corresponding to a point at which the user 205 paused a recording, as disclosed herein with respect to FIG. 8. In other embodiments, identifying the at least one extended reality component may comprise identifying a most recent recording of an interaction with a second user in the extended reality environment 105, as disclosed herein with respect to FIG. 8.

Step 915 of process 900 may include identifying a section of the phased script associated with the topic. The query received from user 205 may be related to a specific topic in the phased script. In some embodiments, the query may be associated with the current section of the phased script. In other embodiments, the query may be associated with a preceding or an upcoming section of the phased script. The section of the phased script associated with the topic may be identified to ensure that the artificial intelligence model provides answer data that is related to the current section of the phased script. If the query is associated with an upcoming section of the phased script, then the artificial intelligence model may provide answer data indicating that the query may (or will) be answered in a later section. If the query is associated with a preceding section of the phased script, then the artificial intelligence model may provide answer data indicating that the query is related to an earlier section of the phased script and/or may generate answer data that includes text or audio from the earlier section or based on the earlier section.

Identifying the section of the phased script may comprise matching the at least one extended reality component from the extended reality environment 105 with the section of the phased script. An extended reality object, such as virtual reality object 235, may include a tag or marker that may identify the extended reality object in a text representation. In some embodiments, process 900 may perform image analysis to determine a tag, marker, or keyword associated with a physical object represented in an augmented reality environment (e.g., gestured to be a user). Process 900 may identify the tag or marker associated with the identified extended reality object. The text-based tag or marker may then be compared to the phased script. For example, process 900 may use the tag or marker as a search term in a search of the phased script. In some embodiments, the tag or marker may be included in metadata associated with or embedded in the identified extended reality object. The location within the phased script where the tag or marker is recognized in a search of the phased script may identify the section of the phased script. In some embodiments, each of the sections of the phased scripts may have an identifying-name or number. In some embodiments, identifying the section of the phased script may comprise identifying the name or the number of the section. In other embodiments, each of the zones of the extended reality environment may have an identifying name or number that may be associated with a section of the phased script. In some embodiments, identifying the section of the phased script may comprise identifying the name or number of the zone that user 205 is located within. Additionally or alternatively, identifying the section of the phased script may comprise matching the at least one extended reality component from the extended reality environment 105 with one or more keywords in the query. In some embodiments, matching of words, may include using a word map or landscape, semantic map, topical map, or any structured (e.g., quantified) relevance representation of closeness in relevance between words, which may be based on a phased script. In some embodiments, a word-to-word match may be considered a "match." Optionally, a "match" may not include an exact word-to-word match. For example, a synonym or a word within a threshold distance according to a relevance representation. It is appreciated that in embodiments where user 205 may not be able to access the phased script, identifying a section of the phased script to cause generation of relevant AI model answer data occurs using actions unperformable by a human user.

Step 920 of process 900 may include generating a prompt based on the query, the at least one extended reality component, and the section of the phased script. The query may provide a question that the user 205 is seeking to receive an answer to. In some embodiments, process 900 may include extracting context and background information related to the query from the at least one identified extended reality component and the section of the phased script (e.g., to influence engineering of the prompt). Generating the prompt may comprise converting the query, the at least one extended reality component, and the section of the phased script into a format that may be readable and understood by an artificial intelligence model. For example, in some embodiments, generating a prompt may include converting the query, the at least one extended reality component, and the phased script into a text representation (e.g., natural language text) and/or token. Process 900 may generate the prompt without any further input from user 205 beyond the query asked by the user, while using information (e.g., the phased script and/or at least one extended reality object. For example, steps 905-935, as disclosed herein with respect to FIG. 9, may occur automatically after user 205 asks a query and user 205 may not need to provide any additional input throughout process 900.

In some embodiments, the prompt may include the entire phased script and an identification of the section of the phased script associated with the topic. In such an embodiment, the prompt may provide background and context to the query by providing the phased script in its entirety as part of the prompt. The prompt may further identify the section of the phased script associated with the topic and/or identify at least one extended reality object, to direct the artificial intelligence model to output improved answer data (e.g., more relevant, more appropriate, more tailored) related specifically to the phased script that the user 205 is engaging with in extended reality environment 105, which can reduce risks of AI model hallucination. In some embodiments, the prompt may further include instructions to generate answer data related to the section of the phased script. For example, the phased script may include a plurality of sections with varying topics that may be interrelated. The prompt may include instructions configured to cause the artificial intelligence model to generate answer data related to the section of the phased script identified in step 915 of process 900. By providing such instructions, process 900 may ensure that answer data generated by the artificial intelligence model is not related to a topic that is outside of the section of the phased script identified in step 915.

In other embodiments, generating the prompt may further comprise generating the prompt based on a query previously received from the user 205. In some embodiments, the user 205 may ask multiple queries on the same or different topics. Process 900 may determine, based on queries that have been previously received from the user 205, additional context and background to the present query received from the user 205. For example, the query presently received by the user 205 may include a question related to a previous query. Process 900 may use the previous query and answer data received in response to the previous query to provide context and background information to the artificial intelligence model (e.g., an artificial intelligence model associated with or implementing all or part of process 900) to allow the artificial intelligence model to generate new answer data that is responsive to the present query. In such an embodiment, the prompt may include both the present query and the prior query received from the user 205 to provide context to the present query.

Step 925 of process 900 may include transmitting the prompt to an artificial intelligence model. An artificial intelligence model may include any feature of machine learning model 140, may be trained as described with respect to FIG. 5, and/or may include any feature of machine learning models discussed above. Step 925 of process 900 may correspond to step 825 of process 800, as disclosed herein with respect to FIG. 8. For example, transmitting the prompt may refer to transmitting, transferring, or providing (e.g., across a network) data or information. Process 900 may transmit the pre-processed prompt that may include the user query, and, optionally, background information and context such as the at least one extended reality object and/or the phased script, to an artificial intelligence model. The artificial intelligence model may be able to determine and/or generate answer data based on the generated prompt, which may direct the artificial intelligence model to output improved answer data (e.g., more relevant, more appropriate, more tailored) compared to a prompt generated without the benefit of disclosed embodiments. Conventional prompt generation may not take into account extended reality components which may hinder the ability of the artificial intelligence model to provide relevant answer data in response to a prompt. Identifying extended reality objects within the extended reality environment 105 and the section of the phased script relevant to the query of user 205 may reduce computational resources required for the artificial intelligence model to provide relevant answer data because the prompt may provide context and background information relevant to the answer data. Improved answer data may not only benefit the user (e.g., enhance learning or information exchange), but may also benefit system components, such as by reducing processing and/or memory loads, which may be created by follow-up queries (e.g., prompted by artificial intelligence model hallucinations). The artificial intelligence model may include a machine learning model or a large language model, as described herein. Transmitting the prompt may further include providing the prompt as input to the artificial intelligence model.

Step 930 of process 900 may include receiving answer data from the artificial intelligence model in response to the transmitted prompt. Step 930 of process 900 may correspond to step 830 of process 800, as disclosed herein with respect to FIG. 8. Answer data may comprise information identified by the artificial intelligence model as responding to the query presented by the user 205. The artificial intelligence model may adjust, enhance, or optimize answer data such that the answer data may be presented in a suitable manner for answering the prompt. For example, the artificial intelligence model can adjust, enhance, or optimize answer data by altering, rephrasing, or reorganizing the answer data such that the answer data may be presented in a more suitable manner for answering a given prompt. Receiving answer data from the artificial intelligence model may comprise receiving the answer data in a natural language format over a network. In some embodiments, the answer data may be limited by the section of the phased script identified in step 915 of process 900. Limiting the answer data by the section of phased script may include using at least a portion of the section of phased script as a constraint during answer data generation, constraining the artificial intelligence model to include a threshold amount or proportion of the section of phased script in the answer data, constraining the artificial intelligence model to include a threshold amount or proportion of keywords from the section of phased script in the answer data, causing the artificial intelligence model to access digital information associated with a topic or keyword of the section of phased script, or in any way using the section of phased script to restrict the information accessible to the AI model for use in answer data generation. By limiting the answer data based on the identified section of the phased script, process 900 may ensure that the artificial intelligence model does not provide irrelevant answer data or answer data that is outside the section of the phased script. This may provide improvements in the field of education, such as when students utilize process 900 for educational purposes. As students may be unfamiliar with the topics they are learning about, limiting answer data by the identified section of the phased script may ensure that students are receiving answer data that is related to the identified section of the phased script. This may prevent students from receiving answer data that may be related to a topic that is earlier or later in the phased script, and therefore irrelevant to the section of the phased script that the student is asking a query about.

Step 935 of process 900 may include generating content in the extended reality environment 105 based on the received answer data. Step 935 of process 900 may correspond to step 835 of process 800, as disclosed herein with respect to FIG. 8. Content may include at least one of an animation, a video, an audio sequence (e.g., computer-generated language), an image, text, or a visualization. In some embodiments, generated virtual content may be associated with one or more real world objects. For example, a generated virtual outline (e.g., bounding box), may be rendered to appear around a real-world object (e.g., in an augmented reality environment) or an extended reality object (e.g., a non-physical computer-generated object). Extended reality environment 105 may present the answer data received in response to the prompt to the user 205 in a variety of ways.

In some embodiments, generating content based on the received answer data may comprise rendering a text display in the extended reality environment. For example, in such an embodiment, extended reality environment 105 may render at least a portion of the answer data for presentation to the user 205 in the form of readable text in the extended reality environment 105. In other embodiments, generating content in the extended reality environment 105 may include playing an audio recording based on the answer data. In such an embodiment, extended reality environment 105 may play at least a portion of the answer data as an audio recording into the extended reality environment 105 for the user 205 to hear (e.g., via a speaker, which may be integrated with and/or connected to a headset) at least a portion of the answer data (or information based on the answer data). In some embodiments, extended reality environment 105 may play the audio recording through a virtual character, such as virtual character 225. In such an embodiment, extended reality environment 105 may animate virtual character 225 to correspond to the audio recording of the at least a portion of the answer data such that it appears that virtual character 225 is answering the query of the user 205. In other embodiments, generating content in the extended reality environment may comprise rendering a virtual reality object, based on at least a portion of the answer data, in the extended reality environment. For example, in such an embodiment, the answer data may be related to a virtual reality object that is rendered by extended reality environment 105 and displayed to the user 205. Rendering a virtual reality object based on the at least a portion of the answer data may provide a visual representation of the answer data which may allow the user to better understand the answer data. In other embodiments, extended reality environment 105 may render an arrow, a highlight, an outline, a box, a circle, or any other visual element around, near, or directed to an existing virtual reality object (or physical object, which may be represented in an augmented reality environment) in the extended reality environment 105. Visual elements such as these may emphasize a portion of or an entire virtual reality object that has already been rendered in the extended reality environment 105 based on the answer data. For example, if the query of the user 205 is related to a virtual reality object in the extended reality environment 105, generating content based on the received answer data may include emphasizing a portion of or the entire existing virtual reality object.

In some embodiments, process 900 may further include identifying at least one recorded session associated with the phased script, identifying a plurality of questions and answers from the recorded session associated with the section of the phased script wherein the prompt may further include the plurality of questions and answers from the recorded session associated with the section of the phased script. In some embodiments, the recorded session may comprise a recorded representation of a live session with a human speaker or a virtual speaker conducted in an extended reality environment. For example, the recorded session may comprise a video or audio recording of a live session conducted by a human speaker or a virtual speaker. The live session may comprise an interaction between a human speaker or a virtual speaker and one or more students conducted in an extended reality environment, such as extended reality environment 105. The recorded session may be associated with the phased script. For example, the human speaker or the virtual speaker may use the phased script to guide the recorded session.

One or more recorded sessions may be stored in a database, such as database 130. The one or more recorded sessions may correspond to one or more phased scripts. For example, a first set of one or more recorded sessions may correspond to a first phased script while a second set of one or more recorded sessions may correspond to a second phased script. Identifying at least one recorded session may comprise identifying the at least one recorded session as corresponding to the phased script. For example, the at least one recorded session may be identified by a name, number, or other identifier or may be identified based on the content of the recorded session. The at least one recorded session may be retrieved from the database. Process 900 may include converting the recorded session into at least one text representation and/or token. Process 900 may further include identifying a plurality of questions and answers from the recorded session associated with the phased script. The questions and answers from the recorded session may comprise questions asked by individuals (e.g., students, audience members) and answered by the human speaker or the virtual speaker. The questions and answers may be related to a topic of the phased script. The plurality of questions and answers may be included in the prompt generated in step 920 of process 900. The plurality of questions and answers may provide additional context to the query asked by a user in process 900. The prompt may instruct the artificial intelligence model to base the answer data on the plurality of questions and answers from the recorded sessions associated with the phased script. In other embodiments, the prompt may instruct the artificial intelligence model to provide answer data within a similarity threshold of the answers from the at least one recorded session. Providing questions and answers from recorded sessions associated with the script may minimize hallucination by the artificial intelligence model by providing sample answers that the artificial intelligence model may use to generate accurate and relevant answer data to the user query.

As used herein, unless specifically stated otherwise, being "based on" may include being dependent on, being associated with, being influenced by, or being responsive to. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and other procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for generating prompts based on a phased script in an extended reality environment, the method comprising:
   receiving a query from a user of the extended reality environment, the query associated with a topic in the phased script, wherein the phased script comprises a pre-planned dialog configured to be read by a virtual speaker in the extended reality environment;
   identifying at least one extended reality component associated with the extended reality environment as relating to the query, the at least one extended reality component comprising at least one of an object or a recording;
   identifying a section of the phased script from a plurality of sections as associated with the topic, wherein the plurality of sections are associated with respective topics;
   generating a prompt based on the query, the at least one extended reality component, and the section of the phased script;
   transmitting the prompt to an artificial intelligence model;
   generating, by the artificial intelligence model, answer data, wherein generating the answer data comprises:
      selecting, by the artificial intelligence model, a data domain from a plurality of data domains, wherein each of the plurality of data domain comprise a category of data associated with the extended reality environment;
      applying weights to data received in the prompt according to the selected data domain to generate the answer data;
      and evaluating the answer data against a confidence threshold;
   in response to the transmitted prompt, receiving the answer data from the artificial intelligence model; and
   based on the received answer data, generating content in the extended reality environment.

2. The method of claim 1, wherein identifying the section of the phased script comprises matching the at least one extended reality component from the extended reality environment with the section of the phased script.

3. The method of claim 1, wherein the prompt comprises instructions to generate answer data related to the section of the phased script.

4. The method of claim 1, wherein the answer data is limited by the section of the phased script.

5. The method of claim 1, wherein the prompt further includes the phased script and an identification of the section of the phased script associated with the topic.

6. The method of claim 1, wherein the phased script comprises a plurality of sections, wherein each of the plurality of sections are associated with a respective topic.

7. The method of claim 1, wherein identifying the section of the phased script comprises identifying at least one of a name or a number of the section.

8. The method of claim 1, wherein generating the prompt comprises converting the query and the at least one extended reality component into a text representation.

9. The method of claim 1, wherein the prompt further comprises a prior query from the user.

10. The method of claim 1, further comprising preprocessing the query, wherein preprocessing the query comprises manipulating data extracted from the query into a data structure processable by an artificial intelligence model and not understandable by the user.

11. A system comprising:
   at least one memory storing instructions;
   at least one processor configured to execute the instructions to perform operations for generating prompts based on a phased script in an extended reality environment, the operations comprising:
      receiving a query from a user of the extended reality environment, the query associated with a topic in the phased script, wherein the phased script comprises a pre-planned dialog configured to be read by a virtual speaker in the extended reality environment;
      identifying at least one extended reality component associated with the extended reality environment as relating to the query, the at least one extended reality component comprising at least one of an object or a recording;

identifying a section of the phased script from a plurality of sections as associated with the topic, wherein the plurality of sections are associated with respective topics;

generating a prompt based on the query, the at least one extended reality component, and the section of the phased script;

transmitting the prompt to an artificial intelligence model;

generating, by the artificial intelligence model, answer data, wherein generating the answer data comprises:

selecting, by the artificial intelligence model, a data domain from a plurality of data domains, wherein each of the plurality of data domain comprise a category of data associated with the extended reality environment;

applying weights to data received in the prompt according to the selected data domain to generate the answer data; and evaluating the answer data against a confidence threshold;

in response to the transmitted prompt, receiving the answer data from the artificial intelligence model; and based on the received answer data, generating content in the extended reality environment.

12. The system of claim 11, wherein the operations further comprise:

identifying at least one recorded session associated with the phased script; and identifying a plurality of questions and answers from the recorded session associated with the section of the phased script, wherein the prompt further includes the plurality of questions and answers from the recorded session associated with the section of the phased script.

13. The system of claim 12, wherein the at least one recorded session comprises a recorded representation of a live session with a human speaker conducted in an extended reality environment.

14. The system of claim 12, wherein the operations further comprise converting the at least one recorded session into at least one text representation.

15. The system of claim 12, wherein the prompt further comprises instructions to provide answer data within a similarity threshold of the answers from the at least one recorded session.

16. The system of claim 12, wherein the at least one recorded session comprises a recorded representation of a live session with a large language model virtual speaker conducted in an extended reality environment.

17. A non-transitory computer readable medium including instructions that are executable by one or more processors to perform operations comprising:

receiving a query from a user of the extended reality environment, the query associated with a topic in the phased script, wherein the phased script comprises a pre-planned dialog configured to be read by a virtual speaker in the extended reality environment;

identifying at least one extended reality component associated with the extended reality environment as relating to the query, the at least one extended reality component comprising at least one of an object or a recording;

identifying a section of the phased script from a plurality of sections as associated with the topic, wherein the plurality of sections are associated with respective topics;

generating a prompt based on the query, the at least one extended reality component, and the section of the phased script;

transmitting the prompt to an artificial intelligence model;

generating, by the artificial intelligence model, answer data, wherein generating the answer data comprises:

selecting, by the artificial intelligence model, a data domain from a plurality of data domains, wherein each of the plurality of data domain comprise a category of data associated with the extended reality environment;

applying weights to data received in the prompt according to the selected data domain to generate the answer data; and evaluating the answer data against a confidence threshold;

in response to the transmitted prompt, receiving the answer data from the artificial intelligence model; and based on the received answer data, generating content in the extended reality environment.

18. The non-transitory computer readable medium of claim 17, wherein generating content in the extended reality environment comprises rendering a text display, based on the answer data, in the extended reality environment.

19. The non-transitory computer readable medium of claim 17, wherein generating content in the extended reality environment comprises playing an audio output based on the answer data.

20. The non-transitory computer readable medium of claim 17, wherein generating content in the extended reality environment comprises rendering a virtual reality object, based on the answer data, in the extended reality environment.

21. The non-transitory computer readable medium of claim 17, wherein identifying the at least one extended reality component comprises determining that the extended reality component is rendered in closest proximity to the user in the extended reality environment relative to at least one other extended reality component.

* * * * *